(12) United States Patent
Imai et al.

(10) Patent No.: US 12,123,886 B2
(45) Date of Patent: Oct. 22, 2024

(54) AUTOMATIC ANALYSIS SYSTEM

(71) Applicant: Hitachi High-Tech Corporation, Tokyo (JP)

(72) Inventors: Kenta Imai, Tokyo (JP); Tomoakira Kawai, Tokyo (JP); Taku Sakazume, Tokyo (JP); Shigeru Yano, Tokyo (JP); Manabu Minegishi, Tokyo (JP); Takahiro Suzuki, Tokyo (JP); Atsushi Watanabe, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 693 days.

(21) Appl. No.: 17/258,265

(22) PCT Filed: May 23, 2019

(86) PCT No.: PCT/JP2019/020433
§ 371 (c)(1),
(2) Date: Jan. 6, 2021

(87) PCT Pub. No.: WO2020/021837
PCT Pub. Date: Jan. 30, 2020

(65) Prior Publication Data
US 2021/0270858 A1   Sep. 2, 2021

(30) Foreign Application Priority Data
Jul. 27, 2018   (JP) .................. 2018-141158

(51) Int. Cl.
*G01N 35/00* (2006.01)
*G01N 1/10* (2006.01)
(Continued)

(52) U.S. Cl.
CPC .......... *G01N 35/0099* (2013.01); *G01N 1/10* (2013.01); *G01N 1/2035* (2013.01);
(Continued)

(58) Field of Classification Search
CPC .......... G01N 35/0099; G01N 35/0092; G01N 2035/00891; G01N 2001/2223;
(Continued)

(56) References Cited

U.S. PATENT DOCUMENTS 4,750,133 A * 6/1988 Eiskamp .............. G01N 21/272
700/266
4,873,633 A * 10/1989 Mezei .................... G01N 33/80
356/442
(Continued)

FOREIGN PATENT DOCUMENTS

CA    2395865 A1 *  8/2001  ............. B01J 19/00
CN    104969074 A    10/2015
(Continued)

OTHER PUBLICATIONS

Search Report mailed Sep. 15, 2022 in European Application No. 19840964.1.
(Continued)

*Primary Examiner* — Stephanie E Bloss
*Assistant Examiner* — Kevin C Butler
(74) *Attorney, Agent, or Firm* — Miles & Stockbridge, P.C.

(57) ABSTRACT

Provided is an automatic analysis system that reduces a personnel burden and increases an operating rate using an autonomous mobile robot while suppressing an initial cost. The automatic analysis system includes: a plurality of devices that are disposed in an automatic analysis area 101 and includes analyzing units 103 and 104 included in an automatic analyzer; and a robot 102 that moves in the automatic analysis area, in which an operation screen of the analyzing unit has a first screen mode for an operator and a second screen mode for the robot and is switchable between the first screen mode and the second screen mode, and the
(Continued)

robot obtains state information of the analyzing unit from the operation screen in the second screen mode.

18 Claims, 14 Drawing Sheets

(51) Int. Cl.
    *G01N 1/20*     (2006.01)
    *G01N 1/22*     (2006.01)
    *G01N 1/24*     (2006.01)

(52) U.S. Cl.
    CPC ............ *G01N 1/2202* (2013.01); *G01N 1/24* (2013.01); *G01N 2001/2223* (2013.01); *G01N 2035/00891* (2013.01); *G01N 35/0092* (2013.01)

(58) Field of Classification Search
    CPC ...... G01N 1/2202; G01N 1/10; G01N 1/2035; G01N 1/24
    USPC .......................................................... 73/863.01
    See application file for complete search history.

(56) References Cited

U.S. PATENT DOCUMENTS

| | | | | |
|---|---|---|---|---|
| 5,841,959 | A * | 11/1998 | Guiremand | G05B 19/0426 345/440 |
| 6,080,364 | A * | 6/2000 | Mimura | G01N 35/026 422/65 |
| 6,556,923 | B2 * | 4/2003 | Gallagher | B01J 19/0046 702/30 |
| 6,846,457 | B1 * | 1/2005 | Tokiwa | G01N 35/00594 422/65 |
| 7,186,217 | B2 * | 3/2007 | Kawasaki | A61B 5/1455 600/300 |
| 7,674,430 | B2 * | 3/2010 | Ouchi | G01N 21/31 422/65 |
| 7,732,212 | B1 * | 6/2010 | Nakata | G01N 35/00871 422/62 |
| 8,150,645 | B2 * | 4/2012 | Kamihara | G01N 35/00663 702/179 |
| 8,524,153 | B2 | 9/2013 | Mimura et al. | |
| 8,580,197 | B2 * | 11/2013 | Glauser | G01N 35/1011 422/65 |
| 8,871,080 | B2 * | 10/2014 | Li | G01N 27/333 73/1.03 |
| 2002/0052696 | A1 * | 5/2002 | Gallagher | G16B 25/00 702/30 |
| 2006/0005640 | A1 * | 1/2006 | Osaka | G01N 35/00871 73/863.83 |
| 2006/0058940 | A1 * | 3/2006 | Kumagai | G08G 1/09675 340/995.13 |
| 2006/0281183 | A1 * | 12/2006 | Sun | G01N 35/00029 436/43 |
| 2007/0217949 | A1 * | 9/2007 | Mimura | G16H 10/40 422/63 |
| 2007/0255756 | A1 * | 11/2007 | Satomura | G01N 1/28 |
| 2008/0063570 | A1 * | 3/2008 | Fujino | G01N 35/00663 422/400 |
| 2008/0109114 | A1 * | 5/2008 | Orita | B25J 9/00 700/248 |
| 2008/0114559 | A1 * | 5/2008 | Yamaguchi | G16H 40/40 702/84 |
| 2009/0142231 | A1 * | 6/2009 | Shibuya | G01N 35/00594 422/68.1 |
| 2009/0222213 | A1 * | 9/2009 | Hamazumi | G01N 35/00663 702/19 |
| 2009/0269242 | A1 * | 10/2009 | Nozawa | G01N 21/274 422/68.1 |
| 2009/0292494 | A1 * | 11/2009 | Imai | G01N 35/00693 702/85 |
| 2010/0222954 | A1 * | 9/2010 | Ichinose | G05D 1/0246 700/255 |
| 2011/0090066 | A1 * | 4/2011 | Yamaguchi | G01N 35/00663 340/10.51 |
| 2011/0160909 | A1 * | 6/2011 | Glauser | B01L 3/02 700/264 |
| 2011/0301917 | A1 * | 12/2011 | Kamihara | G01N 35/00693 702/179 |
| 2012/0000268 | A1 * | 1/2012 | Li | G01N 35/00613 73/1.01 |
| 2013/0266484 | A1 * | 10/2013 | Kamihara | G01N 35/00613 422/82.05 |
| 2014/0094971 | A1 * | 4/2014 | Thieme | G01N 35/00722 700/275 |
| 2015/0147819 | A1 * | 5/2015 | Pedrazzini | G01N 35/1065 436/180 |
| 2015/0369833 | A1 | 12/2015 | Nakasawa et al. | |
| 2017/0217027 | A1 * | 8/2017 | Boucard | B25J 19/023 |
| 2018/0128741 | A1 | 5/2018 | Kamihara et al. | |
| 2020/0096526 | A1 * | 3/2020 | Suter | G06Q 50/28 |
| 2021/0200240 | A1 * | 7/2021 | Ware | G05D 1/0088 |
| 2021/0270858 | A1 * | 9/2021 | Imai | B25J 11/00 |

FOREIGN PATENT DOCUMENTS

| | | | | |
|---|---|---|---|---|
| CN | 104053997 | B | * 12/2016 | ........... B01D 21/262 |
| CN | 114662906 | A | * 6/2022 | |
| CN | 116057384 | A | * 5/2023 | |
| EP | 0496785 | B1 | * 8/1992 | ............... B25J 9/16 |
| EP | 1260818 | A1 | 11/2002 | |
| EP | 1835291 | A2 | 9/2007 | |
| EP | 2068153 | A2 | 6/2009 | |
| EP | 2116850 | A1 | 11/2009 | |
| EP | 2713166 | A1 | * 4/2014 | ....... G01N 35/00722 |
| EP | 3626652 | A1 | * 3/2020 | ....... G01N 35/00663 |
| JP | H04109728 | A | 4/1992 | |
| JP | H05264535 | A | 10/1993 | |
| JP | H08262029 | A | 10/1996 | |
| JP | H11051942 | A | 2/1999 | |
| JP | 2001084034 | A | 3/2001 | |
| JP | 2003057248 | A | 2/2003 | |
| JP | 2005242692 | A | * 9/2005 | |
| JP | 2005351690 | A | 12/2005 | |
| JP | 2006079483 | A | 3/2006 | |
| JP | 2007052629 | A | 3/2007 | |
| JP | 2007248088 | A | 9/2007 | |
| JP | 2008076267 | A | 4/2008 | |
| JP | 2008190832 | A | 8/2008 | |
| JP | 2009133796 | A | 6/2009 | |
| JP | 2009204448 | | 9/2009 | |
| JP | 201055498 | A | 3/2010 | |
| JP | 2010238188 | A | 10/2010 | |
| JP | 4717105 | B2 | * 7/2011 | ............... B25J 13/08 |
| JP | 2012107985 | A | 6/2012 | |
| JP | 5669528 | B2 | * 2/2015 | ............. G01N 21/59 |
| JP | 2015518968 | A | 7/2015 | |
| JP | 201668233 | A | 5/2016 | |
| JP | 2016198839 | A | 12/2016 | |
| JP | 6567814 | B2 | * 8/2019 | |
| JP | 6659231 | B2 | * 3/2020 | |
| KR | 20140092378 | A | * 2/2016 | ............. A61B 17/00 |
| WO | WO-0155711 | A1 | * 8/2001 | .......... B01J 19/0046 |
| WO | 2009130318 | A2 | 10/2009 | |
| WO | 20090142087 | A1 | 11/2009 | |
| WO | 2010073479 | A1 | 7/2010 | |
| WO | WO-2013070756 | A2 | * 5/2013 | ........... B01D 21/262 |
| WO | WO-2016061471 | A1 | * 4/2016 | ............. B01L 3/5085 |
| WO | WO-2017033537 | A1 | * 3/2017 | ............. G01N 15/06 |
| WO | WO-2020021837 | A1 | * 1/2020 | ......... G01N 35/0092 |
| WO | WO-2023042721 | A1 | * 3/2023 | |

OTHER PUBLICATIONS

Search Report mailed Aug. 13, 2019 in corresponding International Application No. PCT/JP2019/020433.
Written Opinion mailed Aug. 13, 2019 in corresponding International Application No. PCT/JP2019/020433.

(56) References Cited

OTHER PUBLICATIONS

International Preliminary Report on Patentability mailed Jun. 20, 2013 in corresponding International Application No. PCT/JP2011/073796.
Search Report mailed Sep. 6, 2017 in corresponding European Application No. 11841265.9.
Office Action mailed Oct. 1, 2012 in Corresponding German Patent Application No. 11 2009 003 799.2.
Search Report mailed Apr. 19, 2022 in European Application No. 19840964.1.
Office Action mailed Oct. 11, 2023 in Chinese Application No. 201980047790.X.

* cited by examiner

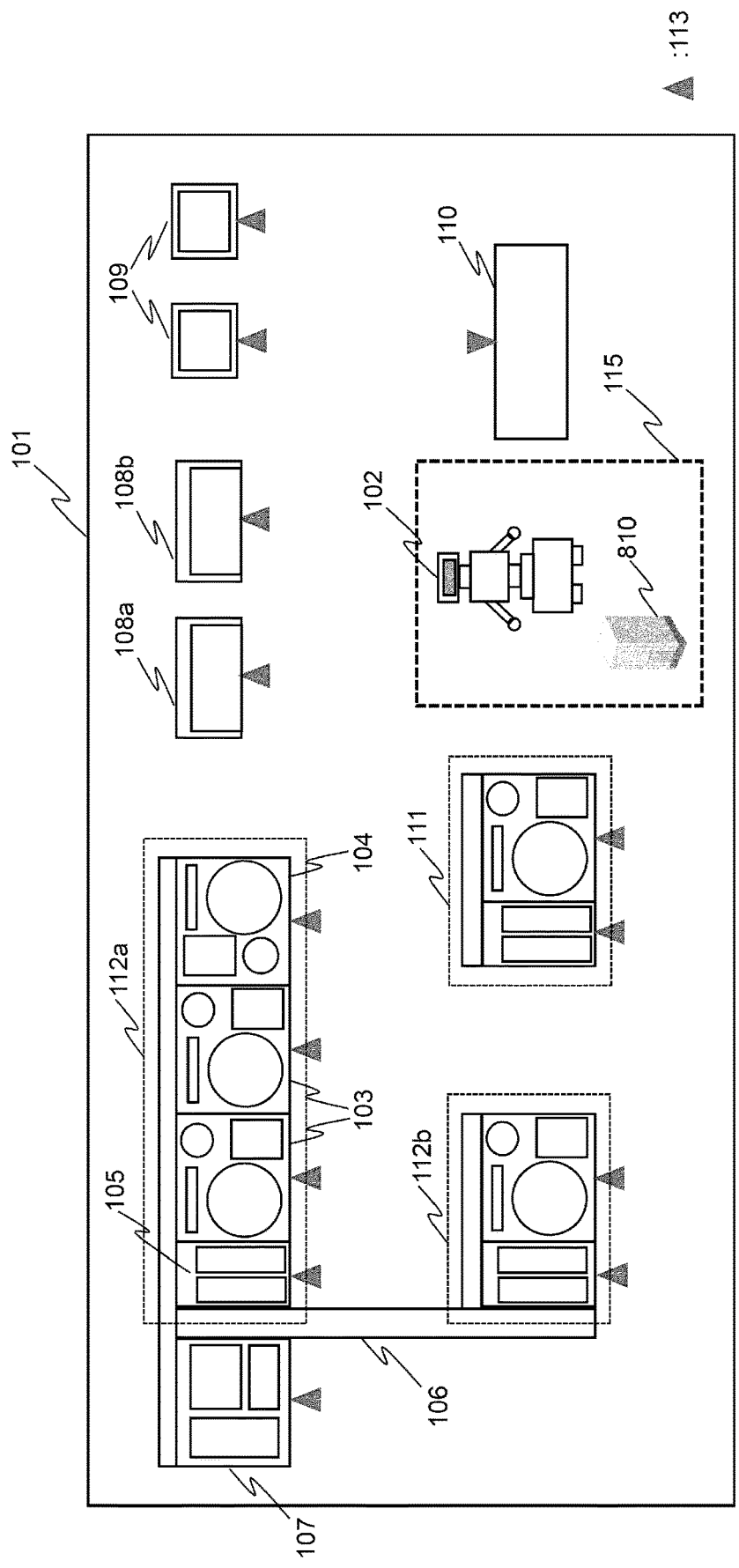

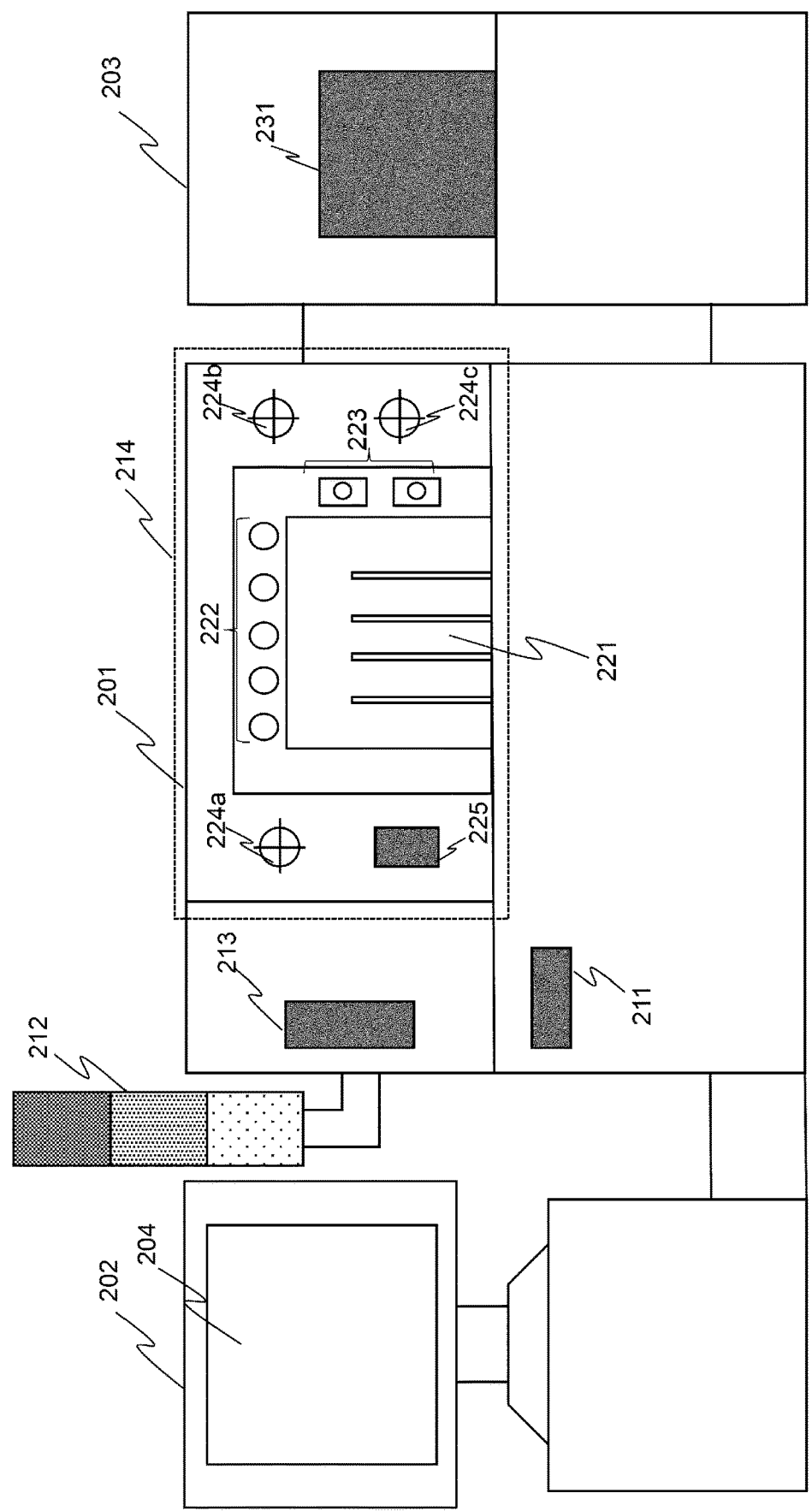

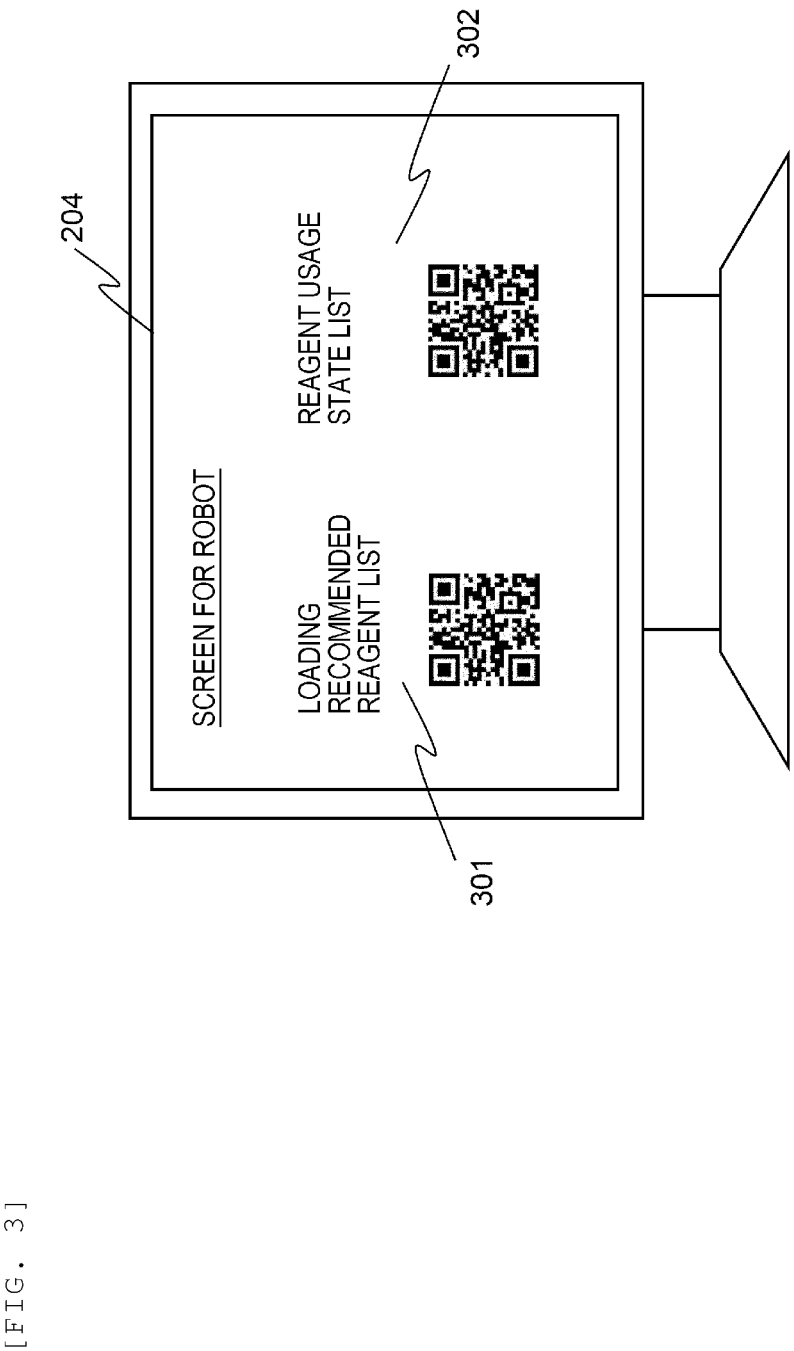
[FIG. 3]

[FIG. 4]
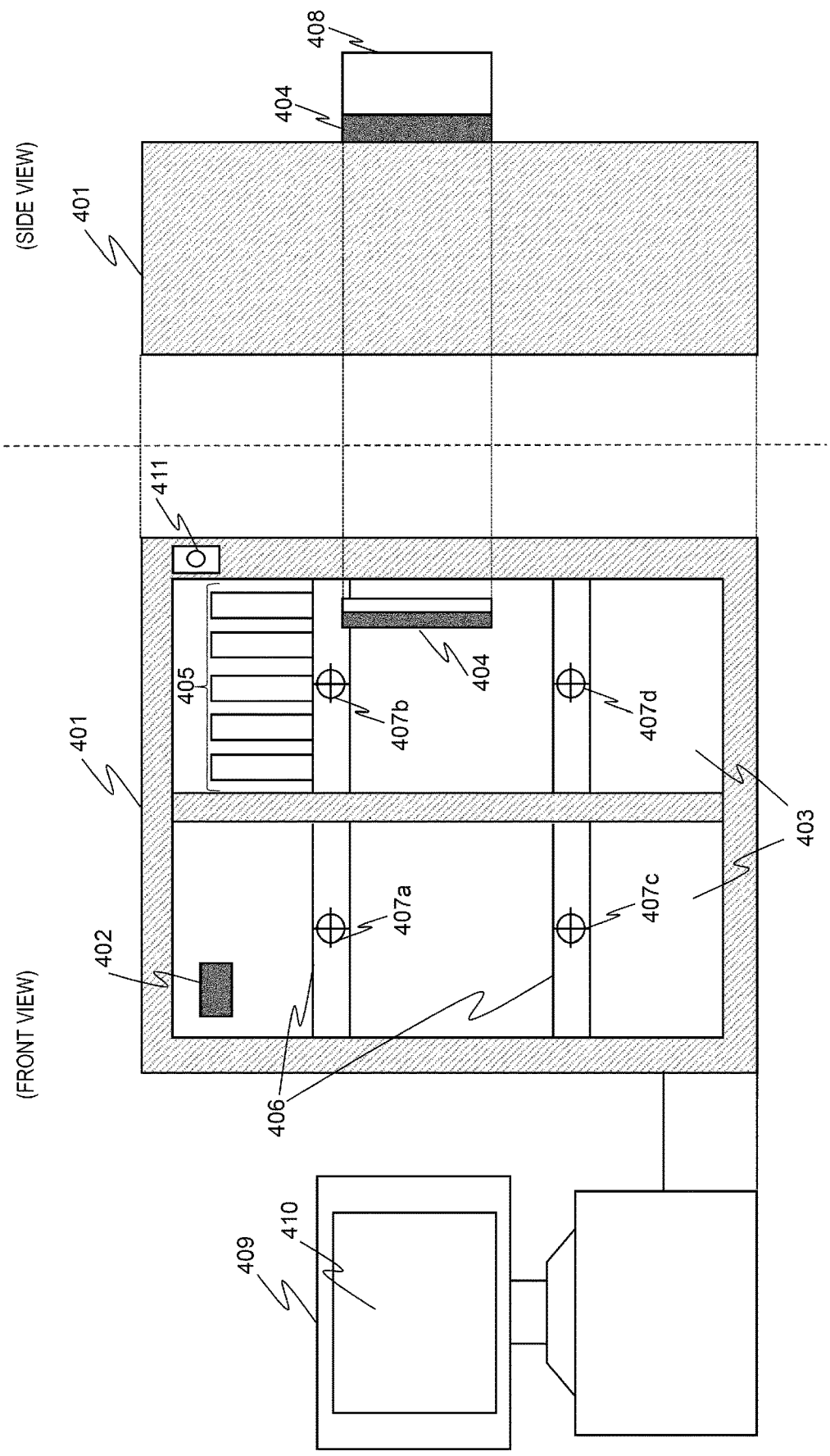

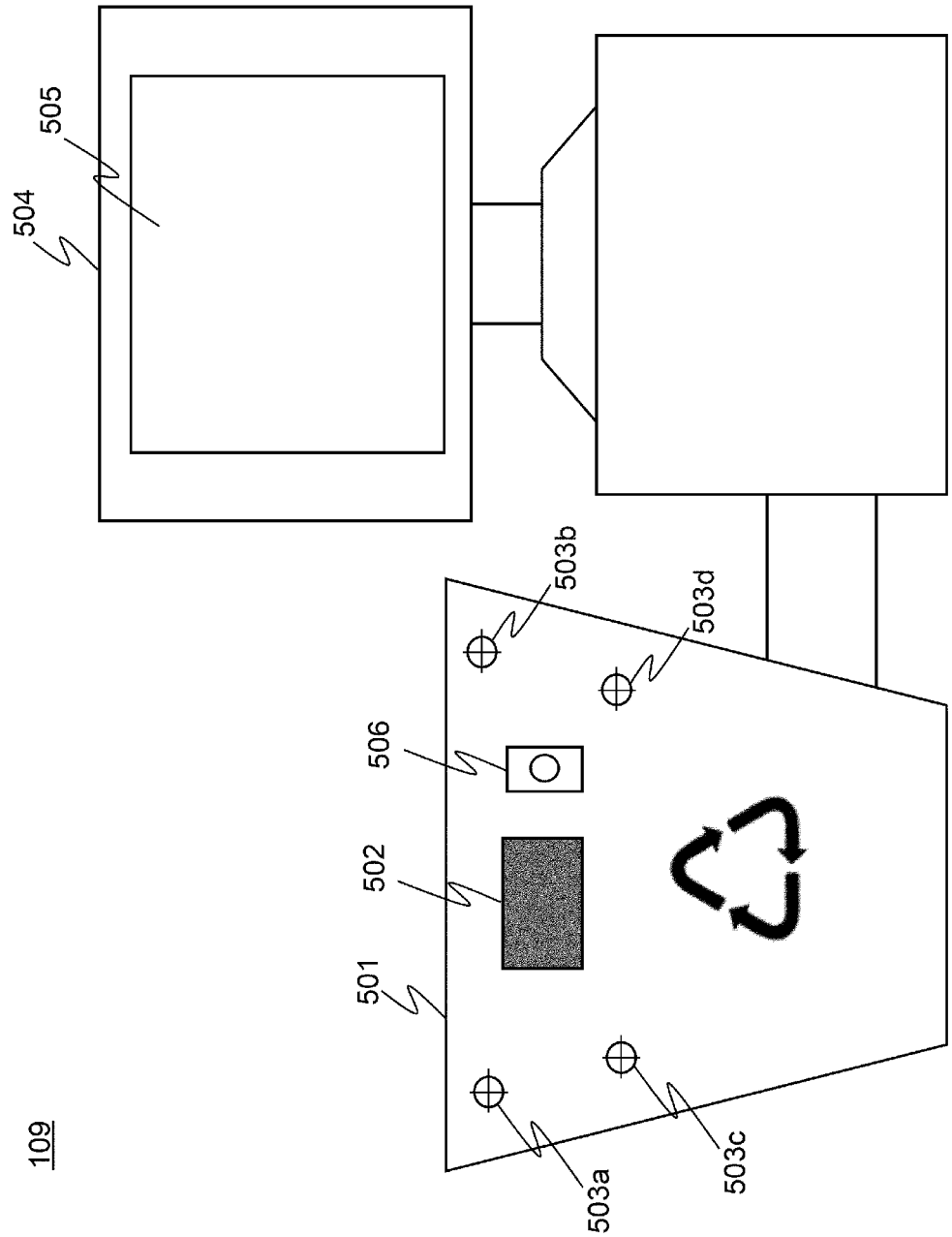
[FIG. 5]

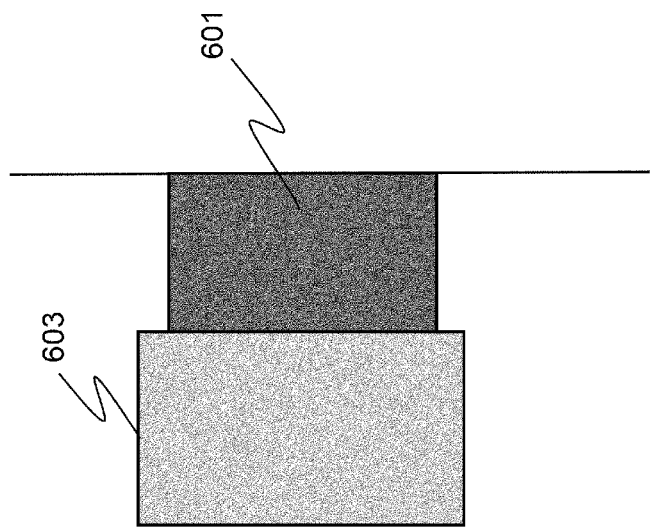
[FIG. 6B]
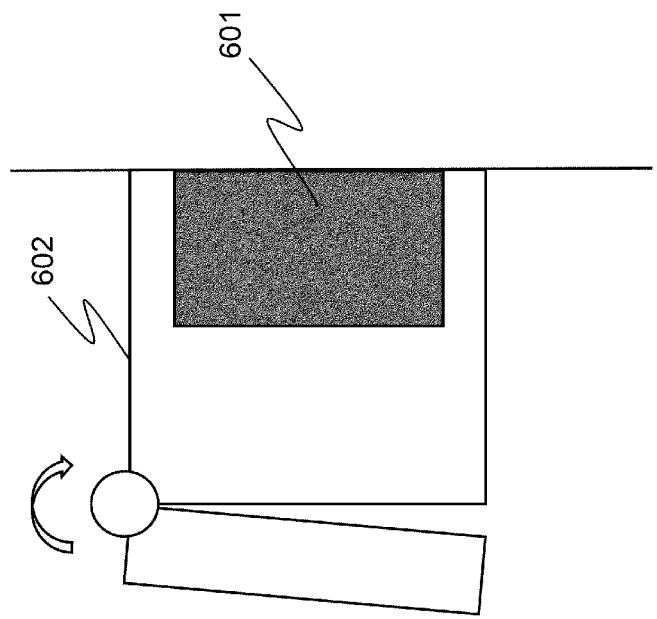
[FIG. 6A]

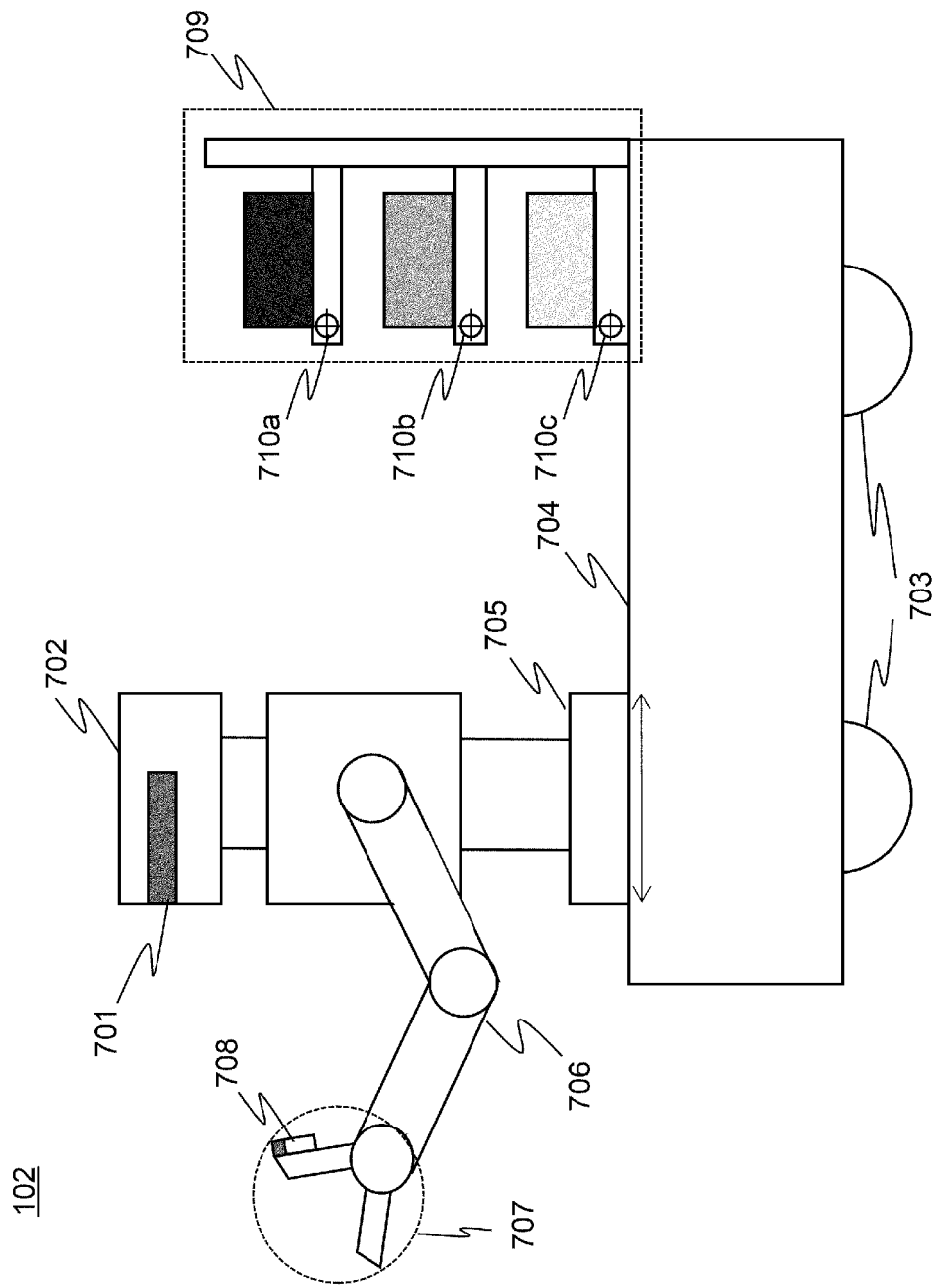

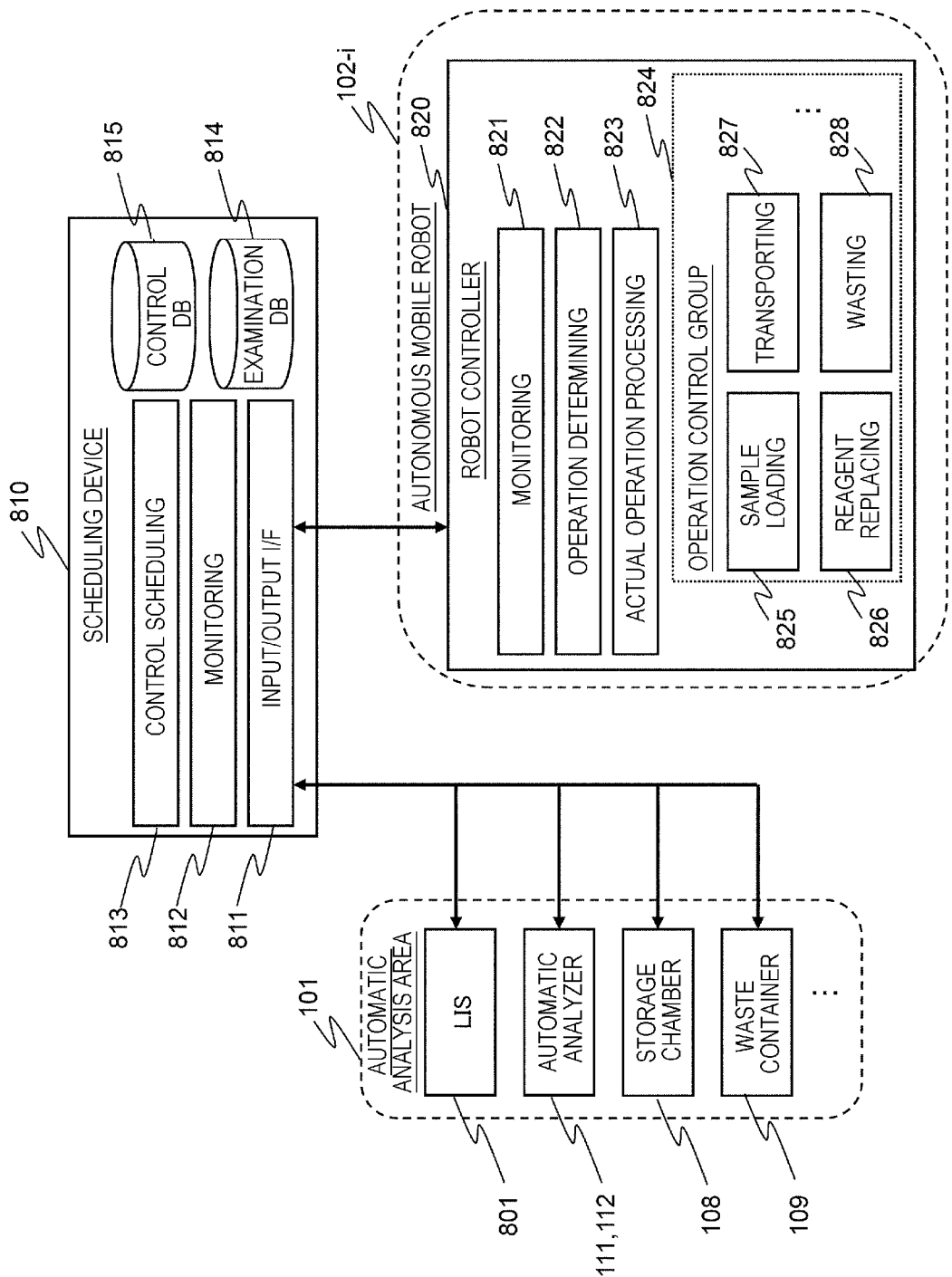

[FIG. 9]
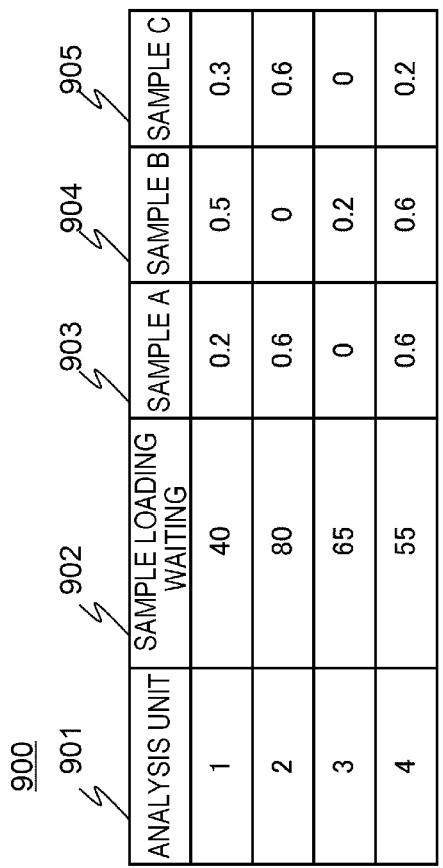
| ANALYSIS UNIT | SAMPLE LOADING WAITING | SAMPLE A | SAMPLE B | SAMPLE C |
|---|---|---|---|---|
| 1 | 40 | 0.2 | 0.5 | 0.3 |
| 2 | 80 | 0.6 | 0 | 0.6 |
| 3 | 65 | 0 | 0.2 | 0 |
| 4 | 55 | 0.6 | 0.6 | 0.2 |
[FIG. 10]
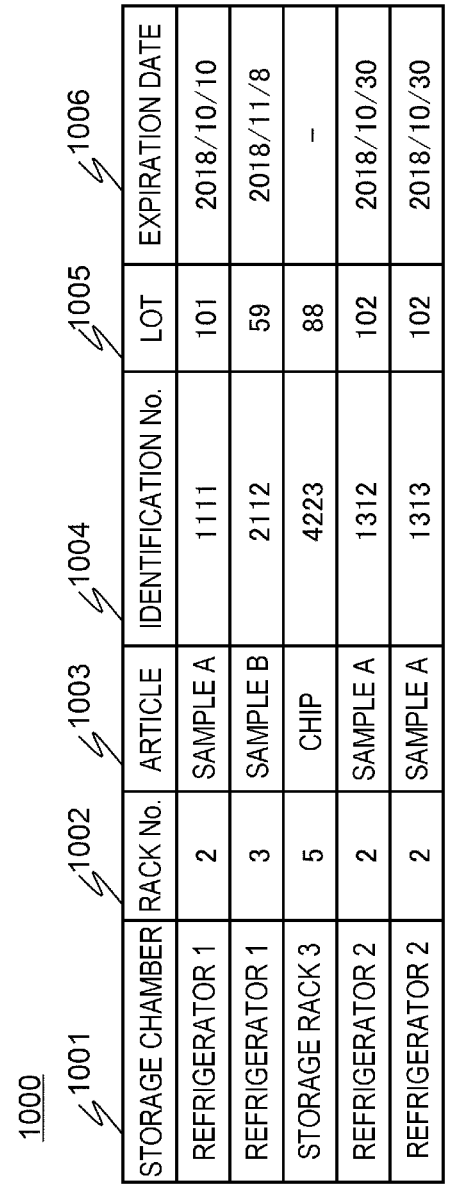
| STORAGE CHAMBER | RACK No. | ARTICLE | IDENTIFICATION No. | LOT | EXPIRATION DATE |
|---|---|---|---|---|---|
| REFRIGERATOR 1 | 2 | SAMPLE A | 1111 | 101 | 2018/10/10 |
| REFRIGERATOR 1 | 3 | SAMPLE B | 2112 | 59 | 2018/11/8 |
| STORAGE RACK 3 | 5 | CHIP | 4223 | 88 | – |
| REFRIGERATOR 2 | 2 | SAMPLE A | 1312 | 102 | 2018/10/30 |
| REFRIGERATOR 2 | 2 | SAMPLE A | 1313 | 102 | 2018/10/30 |

| | 1101 | 1102 | 1103 | 1104 | 1105 | 1106 | 1107 | 1108 |
|---|---|---|---|---|---|---|---|---|
| DATE | TASK ID | PRIORITY | TYPE OF TASK | ROBOT No. | DESTINATION | TARGET | STATE | |
| 5/10 10:30 | 4 | 1 | SAMPLE REPLACING | 5 | 104 | SAMPLE 1083 | WORKING |
| 5/10 10:30 | 5 | 3 | TRANSPORTING | 1 | 104 | CHIP 3387 | NOT PROCESSED |
| 5/10 10:31 | 6 | 1 | SAMPLE LOADING | 3 | 111 | SAMPLE 7003 | WORKING |
| 5/10 10:31 | 7 | 1 | SAMPLE LOADING | 8 | 105 | SAMPLE 7004 | NOT PROCESSED |
| 5/10 10:32 | 8 | 1 | SAMPLE REPLACING | 5 | 103 | REAGENT 1322 | NOT PROCESSED |
| 5/10 10:32 | 9 | 2 | SAMPLE LOADING | 8 | 105 | SAMPLE 7106 | WORKING |

| 1201 | 1202 |
|---|---|
| ROBOT No. | OPERATION MODE |
| 1 | TRANSPORTING |
| 3 | SAMPLE LOADING |
| 4 | SAMPLE REPLACING |
| 5 | SAMPLE REPLACING |
| 8 | SAMPLE LOADING |

[FIG. 13]
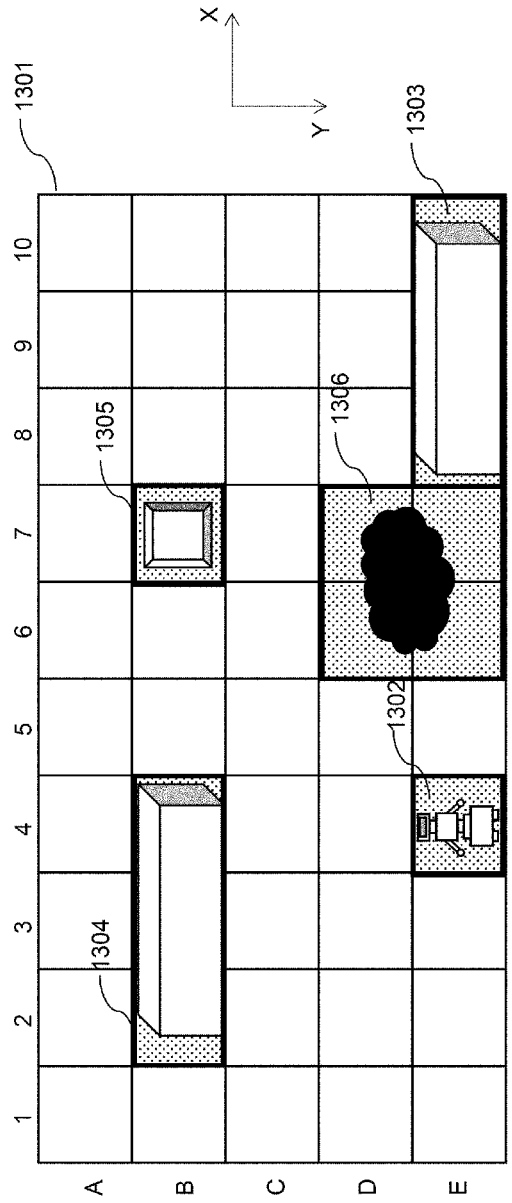
[FIG. 14]
| ROBOT No. | ORDER | ROUTE | ESTIMATED TIME | MOVEMENT CONTENT | MOVING SPEED |
|---|---|---|---|---|---|
| 1 | 2 | D4 | 20:21:30 | MOVING | 3 |
| 1 | 3 | C4 | 20:22:00 | STOPPED | 2 |
| 2 | 1 | B10 | 20:23:10 | DIRECTION CHANGED | 3 |
| 1 | 4 | C4 | 20:25:30 | DIRECTION CHANGED | 1 |
| 1 | 5 | C5 | 20:26:00 | MOVING | 3 |
| 3 | 2 | C10 | 20:26:40 | MOVING | 3 |

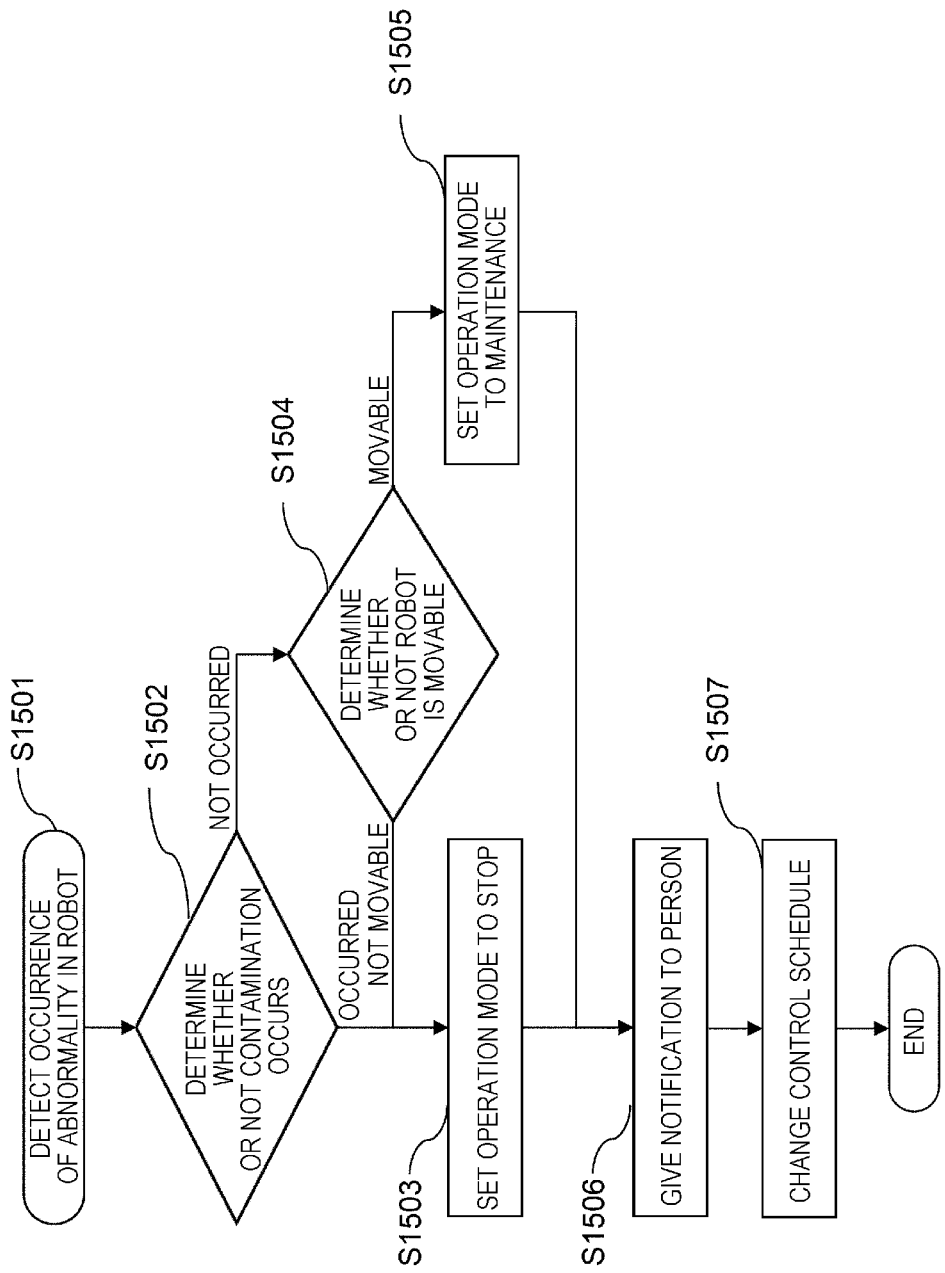

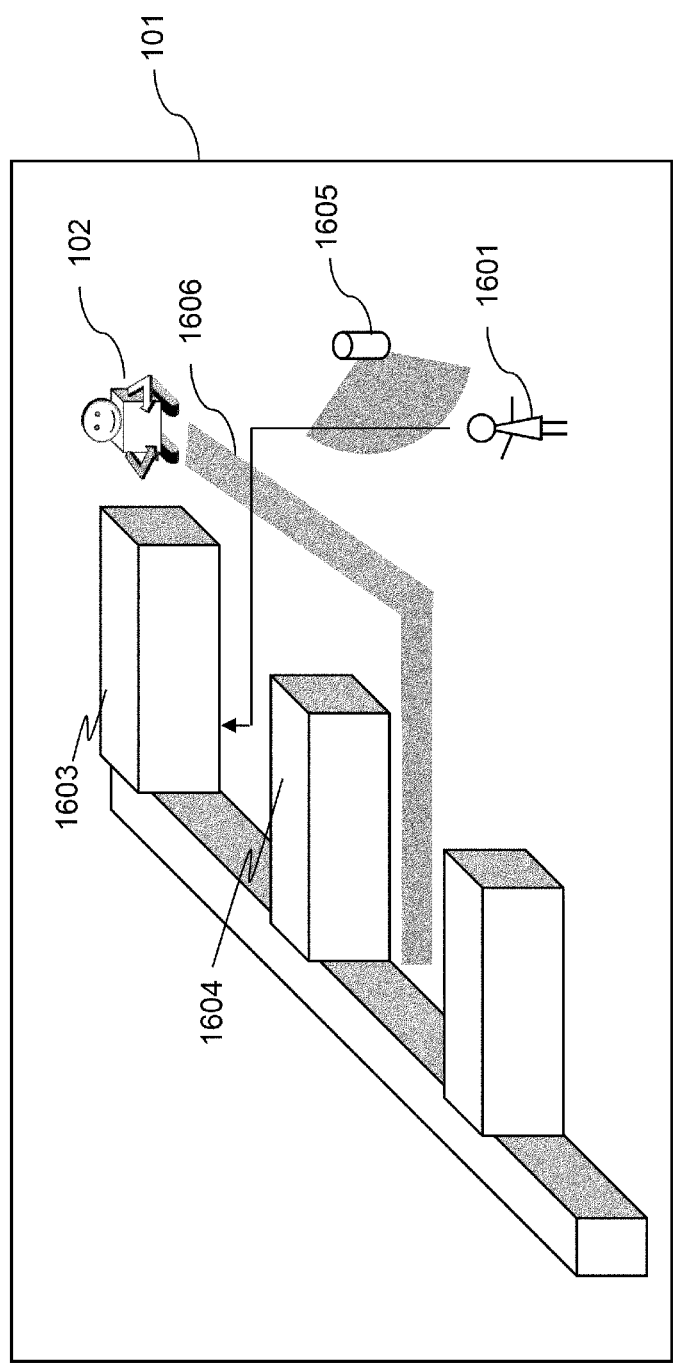
[FIG. 16]

| SAMPLE ID | WARNING LEVEL | EXAMINATION ITEM |
|---|---|---|
| SAMPLE 7001 | 1 | ITEM A |
| SAMPLE 7003 | 1 | ITEM B |
| SAMPLE 7003 | 5 | ITEM E |
| SAMPLE 7004 | 1 | ITEM C |
| SAMPLE 7004 | 1 | ITEM B |
| SAMPLE 7004 | 1 | ITEM A |
| SAMPLE 7005 | 1 | ITEM C |

| PERIOD OF TIME | | AREA 1 | AREA 2 |
|---|---|---|---|
| START TIME | END TIME | | |
| 2018/12/10 15:00 | 2018/12/10 16:00 | 5 | 4 |
| 2018/12/10 16:00 | 2018/12/10 17:00 | 5 | 4 |
| 2018/12/10 17:00 | 2018/12/10 18:00 | 5 | 4 |
| 2018/12/10 18:00 | 2018/12/10 19:00 | 0 | 2 |
| 2018/12/10 19:00 | 2018/12/10 20:00 | 0 | 2 |
| 2018/12/10 20:00 | 2018/12/10 21:00 | 0 | 0 |
| 2018/12/10 21:00 | 2018/12/10 22:00 | 0 | 0 |

AUTOMATIC ANALYSIS SYSTEM

TECHNICAL FIELD

The present invention relates to an automatic analysis system for analyzing a specific component contained in a sample derived from a biosample such as blood and urine.

BACKGROUND ART

In medical fields, various types of automatic analyzers have been developed for labor saving of examination and analytical work. Hospital and examination organizations utilize many automatic analyzers for examining blood and urine. The automatic analyzers for analyzing the specific component contained in the sample derived from the biosample such as blood and urine is configured to perform automatic analysis using samples, reagents, and consumables loaded into the automatic analysis apparatus.

Patent Literature 1 discloses the laboratory automated system.

Patent Literature 2 discloses the autonomous mobile robot for transporting the sample and the reagent to the automatic analyzer in the laboratory.

CITATION LIST

Patent Literature

Patent Literature 1: Japanese Unexamined Patent Application Publication (Translation of PCT Application) No. 2015-518968
Patent Literature 2: Japanese Unexamined Patent Application Publication No. 2016-68233

SUMMARY OF INVENTION

Technical Problem

Appropriate management of consumables such as the reagent is essential for avoiding interruption of the automatic analysis process executed in the automatic analyzer so that the analysis efficiency is improved. Because of limited capacity of the automatic analyzer for accommodating loadable samples and consumables such as reagents and dispensation chips, shortage of the sample and the consumable may prevent the automatic analyzer from performing the ongoing analysis, resulting in waiting time until the analysis result is obtained.

The operator has to replenish the samples and consumables in shortage in advance for coping with the deficiency. In the nighttime when the operator is absent, or in the small-scale laboratory in the absence of the skilled operator, such replenishing work has been an obstacle to improve the analysis efficiency.

Employment of the fully automated system as disclosed in the patent literature 1 may cause the risk of a high rise in the user's initial cost. It is likely that the laboratory to which the fully automated system can be applied is limited. The inventors have focused on the approach for increasing the operation ratio and analysis efficiency of the automatic analysis system by utilizing the autonomous mobile robot for supporting operators. The currently employed automated analyzer is assumed to be operated by the operator (human). In the absence of the human, the autonomous mobile robot is not allowed to replenish the samples and the consumables in shortage alone.

It is an object of the present invention to provide an automatic analysis system, an automatic analyzer, an autonomous mobile robot, and a scheduling device for scheduling the autonomous mobile robot for improving the operation ratio utilizing the autonomous mobile robot to reduce the burden on human resources while suppressing user's initial costs.

Solution to Problem

The automatic analysis system according to an embodiment of the present invention includes a plurality of devices that are disposed in an automatic analysis area and includes an analyzing unit included in an automatic analyzer, and a robot that moves in the automatic analysis area. An operation screen of the analyzing unit has a first screen mode for an operator and a second screen mode for the robot and is switchable between the first screen mode and the second screen mode. The robot obtains state information of the analyzing unit from the operation screen in the second screen mode.

The automatic analysis system according to another embodiment of the present invention includes a plurality of devices that are disposed in an automatic analysis area, a robot that moves in the automatic analysis area, and a scheduling device that assigns a task to the robot based on state information of the devices. The scheduling device is communicably connected to at least one of the devices and obtains state information of the communicably connected device. The robot detects a signal output from the devices in the automatic analysis area, obtains state information of the device outputting the signal, and transmits the obtained state information to the scheduling device.

Advantageous Effects of Invention

The automatic analysis system is provided for improving the operation ratio utilizing the autonomous mobile robot to reduce the burden on human resources while suppressing user's initial costs.

Other problems and further characteristics will be clarified by the description of the specification and accompanying drawings.

BRIEF DESCRIPTION OF DRAWINGS

FIG. 1 is a diagram illustrating a schematic configuration of an automatic analysis system.

FIG. 2 is a diagram illustrating the external appearance of an analyzing unit.

FIG. 3 is a diagram illustrating a display example in a screen mode for an autonomous mobile robot.

FIG. 4 is a schematic diagram illustrating a refrigerator.

FIG. 5 is a schematic diagram illustrating a waste container.

FIG. 6A is a schematic diagram illustrating an operation button (for an operator).

FIG. 6B is a schematic diagram illustrating an operation button (for the autonomous mobile robot).

FIG. 7 is a schematic diagram illustrating the autonomous mobile robot.

FIG. 8 is a control block diagram illustrating the automatic analysis system.

FIG. 9 illustrates an example of operation information of the analyzing unit.

FIG. 10 illustrates an example of consumable information of a storage chamber.

FIG. 11 illustrates an example of task management data.

FIG. 12 illustrates an example of operation mode management data of the autonomous mobile robot.

FIG. 13 is a map of an automatic analysis area.

FIG. 14 illustrates an example of a moving path table.

FIG. 15 is a flowchart illustrating a case where an abnormality occurs in the autonomous mobile robot.

FIG. 16 is a diagram illustrating a state where the operator and the autonomous mobile robot are close to each other.

FIG. 17 illustrates an example of a sample management table.

FIG. 18 illustrates an example of an operator management table.

MODES FOR CARRYING OUT THE INVENTION

FIG. 1 is a diagram illustrating a schematic configuration of an automatic analysis system. The automatic analysis system is constituted by various devices and units included in an automatic analysis area 101 (for example, laboratory) as an area where the automatic analysis is carried out. The automatic analysis area 101 includes an autonomous mobile robot 102 which is autonomously movable, analyzing units 103, 104 for automatic analysis (each of different type), a processing unit 105 for executing a preparatory operation for automatic analysis and storage of articles to be used, a sample transport device 106 for automatically transporting the sample by connecting automatic analyzers 112a, 112b (in this case, the structure formed by connecting at least the single analyzing unit to the single processing unit in parallel is referred to as the automatic analyzer), a controller 107 of the sample transport device, a refrigerator 108a for storing a refrigeration-required product such as the reagent and the sample on refrigeration, a storage rack 108b for storage of consumables such as a dispensation chip and a reaction vessel (a storage chamber 108 will be used herein as a general term that stands for the refrigerator and the storage rack for storing the consumables), a waste container 109 for disposing a waste product such as an empty reagent vessel, and a work table 110 on which a temporary operation is executed. An automatic analyzer 111 that is not connected to the sample transport device 106 may be included in the area. A triangle mark 113 in the drawing indicates an access position for the autonomous mobile robot 102 to execute the process to each of the devices or units. A scheduling device 810 for scheduling the autonomous mobile robot 102 is provided in a wait station 115. In the wait station 115, the autonomous mobile robot 102 accesses the scheduling device 810 before/after execution of the task to recognize the assigned task, and to report completion of the task after execution of the task. The autonomous mobile robot 102 to which the task is assigned by the scheduling device 810 moves in the automatic analysis area 101 in accordance with the content of the task, accesses the corresponding device or the unit at the position marked with the triangle mark 113, and executes the predetermined operation. Operations of the autonomous mobile robot 102 will be described later.

FIG. 2 is a diagram illustrating an external appearance of the analyzing unit 103 (the analyzing unit 103 will be exemplified, which applies to the analyzing unit 104). The analyzing unit 103 includes an analyzing unit 201 for executing analysis, a controller 202 including an operation screen 204, and a sample loading/discharging unit 203 for loading or discharging the sample. The analyzing unit 201 includes an analyzing unit identification information display unit 211 for displaying individual identification information of the analyzing unit 103, an analyzing unit state display unit 212 for displaying a state of the analyzing unit 103, an analyzing unit internal operation unit 213 that allows execution of a part of operations by the analyzing unit 103, and a reagent consumable loading unit 214 for loading the reagent and the consumable.

The analyzing unit identification information display unit 211 is an information tag such as two-dimensional bar codes and RFID labels used for identifying the analyzing unit placed in the automatic analysis area 101 by the autonomous mobile robot 102. As illustrated in FIG. 1, the analyzing unit identification information display unit 211 is useful when a plurality of analyzing units exist in the automatic analysis area 101. The analyzing unit identification information display unit 211 allows easy selection of the specific analyzing unit from those in the automatic analysis area 100, and easy execution of the process in association with the analyzing units identified based on identification information.

The analyzing unit state display unit 212 allows visual recognition of the state of the analyzing unit 103 from a position apart from the analyzing unit by means of the display that makes multiple colors switchable, and a warning lamp that can perform blinking display. The analyzing unit internal operation unit 213 includes an operation button, a display screen, and a state display light, and serves as an operation unit for executing some part of functions of the analyzing unit 103 without intervention of the controller 202.

The reagent consumable loading unit 214 includes a loading port 221 through which reagents and consumables are loaded (it is preferable to provide a plurality of loading ports), a reagent consumable state display unit 222 for displaying the state of the reagent or the consumable, an operation button 223 for executing the operation required for loading the reagent and the consumable, position markers 224a to 224c for the autonomous mobile robot 102 to recognize the accessing position (corresponding to the triangle mark 113 of FIG. 1) for operating the analyzing unit 103, and a reagent consumable loading unit identification information display unit 225 for displaying individual identification information of the reagent consumable loading unit 214.

The reagent consumable state display unit 222 may be an LED light configured to make multiple colors switchable, and enable the blinking display. The light emitting state of the LED light corresponding to the specific reagent or the consumable is changed so that the need of replenishment of the reagent or the consumable is visually recognizable. Preferably, the analyzing unit state display unit 212 and the reagent consumable state display unit 222 are configured to allow various control of different colors and different blinking time periods to ensure transmission of complicated information to the operator and the autonomous mobile robot 102.

The operation button 223 may be a start button for starting the loading operation, an end button for finishing the loading operation, and an extension button for extending the loadable time. The reagent consumable loading unit identification information display unit 225 is the information tag, for example, the two-dimensional bar code and the RFID label for the autonomous mobile robot 102 to identify the reagent and the consumable to be loaded to the reagent consumable loading unit 214.

The controller 202 controls information display relating to the analyzing unit 103, and the analyzing unit 103 using the operation screen 204 and an input device such as a keyboard. The analyzing unit 103 includes an interface for the operator (human) and an interface for the autonomous mobile robot. In this example, the interface is discriminated by a different screen mode on the operation screen 204. The operation screen 204 allows the screen mode to be switchable between a screen mode for operator for displaying the state using characters and images for the operator (human), and a screen mode for autonomous mobile robot for displaying the information tag such as the two-dimensional bar code for communicating the information with the autonomous mobile robot 102. For example, the screen mode for autonomous mobile robot may be displayed on the operation screen 204 as default, and switchable to the screen mode for operator using a switching button on the screen or through instruction of switching from the input device. Alternatively, the default screen mode (interface) may be set in accordance with the time period.

The sample loading/discharging unit 203 may be integrated with the analyzing unit 201, or connected to another analyzing unit 201 as illustrated in FIG. 2. A loading/discharging position 231 simply shown in the drawing includes an identification information display section, and a position marker as described with respect to the reagent consumable loading unit 214. This allows the autonomous mobile robot 102 to easily perform loading of the sample, disposal of the used sample and the like. Detailed explanation on operations of the autonomous mobile robot 102 will be omitted herein as they are similar to the case of the reagent consumable loading unit 214.

FIG. 3 is a diagram illustrating a display example in a screen mode for autonomous mobile robot on the operation screen 204 of the analyzing unit. In this example, the two-dimensional bar codes are displayed on the screen for transmitting the information to the autonomous mobile robot 102 efficiently. More information may be efficiently transmitted by displaying multiple bar codes on the single operation screen 204 rather than displaying the single bar code on the single operation screen 204. For example, a two-dimensional bar code 301 contains the information of a list of reagents recommended to be loaded to the analyzing unit 103. A two-dimensional bar code 302 contains the information of a list of usage state of the reagent that has been loaded into the analyzing unit 103. By obtaining the information from the analyzing unit 103, the autonomous mobile robot 102 is capable of recognizing the reagent to be loaded or discharged. The two-dimensional bar code is given for illustration, and accordingly, it is possible to use a one-dimensional bar code. Besides the information transmission, the touch operation button to be displayed on the operation screen 204 as a touch panel, if any, may be made larger than the button for human.

Display of different interfaces on the operation screen is advantageous since no specific hardware is required, and the screen for robot may be set to allow the operator to recognize the information transmitted to the autonomous mobile robot. The interface as described in the embodiment is not limited to the screen display. It is possible to provide an additional wireless interface. In this case, the resultant configuration is required not to adversely affect the precision equipment disposed in the automatic analysis area. In an example, it is possible to realize the interface of communication system which allows information transmission in the communication area of short distance such as NFC (Near Field Communication). Alternatively, the information may be transmitted wiredly. The explanation of the analyzing unit 103 has been given for illustration. Each of systems, apparatuses, units (to be collectively called device) which are disposed in the automatic analysis area, and require access of the autonomous mobile robot 102 has the interface for operator (human) and the interface for autonomous mobile robot.

FIG. 4 is a schematic diagram illustrating an outer appearance of the refrigerator 108a. For example, a main body 401 includes a refrigerator identification information display unit 402 for displaying individual identification information of the refrigerator 108a, a sliding door 403 operated in left-right direction to allow opening and closing of the refrigerator, a knob 404 for moving the sliding door, a rack 406 for storing a refrigeration-required product 405 such as the reagent, and position markers 407a to 407d for the autonomous mobile robot 102 to recognize the position required for the operation. The refrigerator provided with the sliding door 403 may be easily opened and closed by the autonomous mobile robot 102. The knob 404 provided with an access portion 408 may be easily gripped by the manipulator of the autonomous mobile robot 102. The access portion 408 ensures to enlarge an area of the knob so that sufficient length of the part to be gripped by the manipulator of the autonomous mobile robot 102 is secured in the forward direction. Preferably, the refrigerator 108a is configured to be connected to a controller 409 including an operation screen 410 in addition to the main body 401. As described referring to FIG. 3, the controller 409 allows the operation screen 410 to display the two-dimensional bar code or the like, and the information to be efficiently transmitted to the autonomous mobile robot 102. Similar to the description with respect to the operation screen 204 of the analyzing unit, it is possible to transmit the information such as the list of the reagents recommended to be taken from the refrigerator 108a, and the list of the usage state of the reagent currently stored in the refrigerator. The main body 401 of the refrigerator may be provided with at least one or more operation buttons 411. For example, the operation button 411 is used for automatically opening and closing the sliding door 403. Provision of the operation button allows the autonomous mobile robot 102 to easily use the refrigerator 108a.

FIG. 5 is a schematic diagram illustrating an outer appearance of the waste container 109. A waste container main body 501 has a top section opened to allow the autonomous mobile robot 102 to dispose the used reagent from above. The waste container main body 501 includes a waste container identification information display unit 502 for displaying the individual identification information of the waste container, and position markers 503a to 503d which allow the autonomous mobile robot 102 to recognize the position necessary for operations. More preferably, the waste container 109 is configured to be connected to a controller 504 including an operation screen 505 in addition to the waste container main body 501. The controller 504 allows the operation screen 505 to display the two-dimensional bar code or the like, and the information to be efficiently transmitted to the autonomous mobile robot 102. Similar to the description with respect to the operation screen 204 of the analyzing unit, it is possible to transmit the information such as the list of the reagents recommended to be disposed into the waste container 109, and the list of the reagents which have been currently disposed in the waste container 109. The waste container main body 501 may be provided with at least one or more operation buttons 506 of the waste container. For example, the operation button 506 is used for automatically opening and closing an opening/closing lid, if any, of the waste container main body 501. Provision of the operation button allows the autonomous mobile robot 102 to easily use the waste container 109.

FIG. 6B is a schematic diagram illustrating a structure of an operation button suitable for operations carried out by the autonomous mobile robot 102. Meanwhile, FIG. 6A is a schematic diagram illustrating a structure of an operation button suitable for operations carried out by the operator (human). The operation button as shown in FIG. 6A includes a button portion 601, and a cover portion 602 which is opened and closed for switching an accessible/inaccessible to the button portion 601. The cover portion 602 is intended not to allow, in most cases, the operator to press the button by mistake (unintentionally). Meanwhile, the operation button as shown in FIG. 6B includes a buffer material 603 such as rubber without the cover portion 602. Mostly, when the autonomous mobile robot 102 accesses the operation button, it is difficult for the manipulator of the autonomous mobile robot 102 to turn the cover portion 602 for opening or closing. The difficulty is caused by the need of accurate position control and opening force control of the manipular for turning the cover portion while holding its movable section. Meanwhile, as the autonomous mobile robot 102 is operated in accordance with the program, there is little chance that the button is operated by mistake likewise the human. Therefore, the cover portion 602 is removed, and the buffer material 603 is provided for avoiding damage to the button portion 601 under the force applied by the autonomous mobile robot 102 to press the button portion 601. Each of the autonomous mobile robot 102, the structure of the operation button, and the installation position differs, respectively. Accordingly, the force of the autonomous mobile robot 102 to press the button portion 601 may be excessively strong to damage the operation button. The buffer material 603 may reduce the possibility of damage to the operation button. Preferably, the operation button is switchable between the states as shown in FIG. 6A and FIG. 6B by making the cover portion 602 and the buffer material 603 detachable.

FIG. 7 is a schematic diagram illustrating an outer appearance of the autonomous mobile robot 102. The autonomous mobile robot 102 includes a head portion 702 provided with an image input device 701 such as a camera serving as an eye, which can recognize shapes, characters, luminance, or colors, a driving portion 703 for moving the autonomous mobile robot 102, a loading stand portion 704 with a space that allows temporary storage and processing of the article, a rotating mechanism 705 for the omnidirectional view derived from the image input device 701 by turning the head portion 702 at 360°, an extensible arm portion 706, a hand portion 707 for gripping the article and pressing the button, a sensor device 708 of the hand portion 707 or the arm portion 706, and a storage rack 709 for holding at least one or more articles to be transported such as the reagent and the dispensation chip. The sensor device 708 is provided for reading the label affixed to the reagent, for example, the bar code and the RFID tag. The storage rack 709 has position markers 710a to 710c to allow the autonomous mobile robot 102 to recognize the position required for operations so that the article is taken in and out. The foregoing structure allows the autonomous mobile robot 102 to transport multiple kinds of consumables such as reagents to the analyzing units 103, 104, the storage chamber 108, the waste container 109, and the work table 110, and carry out a series of loading and discharging operations. The autonomous mobile robot 102 may be provided with the sensor of type other than the one as described above, or the RFID tag for individual identification.

FIG. 8 is a control block diagram illustrating the automatic analysis system. The system is designed to operate n units of autonomous mobile robots 102-$i$ ($1 \leq i \leq n$, $n \geq 1$) in the automatic analysis area 101. Schedule management of the respective autonomous mobile robots 102-$i$ is executed by the scheduling device 810. The scheduling device 810 is configured by an information processor such as PC (Personal Computer) and a server, and includes an input/output interface (I/F) function 811, a monitoring function 812, a control scheduling function 813. The storage device stores an examination database (examination DB) 814 for recording the state of the automatic analysis area 101, and a control database (control DB) 815 relating to the control schedule of the autonomous mobile robot 102. The examination DB 814 and the control DB 815 may be stored in a storage device different from the scheduling device 810. The scheduling device 810 may be configured to access those DBs via the network.

The state information of the device disposed in the automatic analysis area 101 is taken by the scheduling device 810 via the input/output I/F function 811. Specifically, the automatic analyzers 111, 112, the storage chamber 108, the waste container 109 as illustrated in FIG. 2, and a clinical laboratory information system (LIS) 801 are communicably connected to the scheduling device 810. The scheduling device 810 regularly sends inquiries to the respective devices, and receives the state information (for example, residual quantity of the consumable) in response to the inquiries from the respective devices. The state information stands for the information necessary for executing the analysis and examination by the automatic analysis system without interruption. Items of the state information in response are preliminarily specified by the automatic analysis system for each of the devices. The automatic analysis system does not necessarily require all the devices disposed in the automatic analysis area 101 to be communicably connected to the scheduling device 810. It is acceptable that some of the devices in the automatic analysis area 101 cannot communicate with the scheduling device 801. The autonomous mobile robot 102 monitors the display screen (see FIG. 3) of such uncommunicable device to recognize the state in the automatic analysis area 101. The recognized state is then transmitted to the scheduling device 810. All the devices in the automatic analysis area 101 do not have to be communicable to the scheduling device 810. In this case, the autonomous mobile robot 102 monitors display screen and the warning signal output from those devices to recognize the state in the automatic analysis area 101. Based on the state, the scheduling device 810 executes the schedule management of the autonomous mobile robot 102. This makes it possible to introduce the automatic analysis system of the embodiment irrespective of the level of information networking of the device in the automatic analysis area 101.

The monitoring function 812 of the scheduling device 810 updates the examination DB 814 upon each obtainment of states of the sample, reagent, consumable and the like relating to the devices and units in the automatic analysis area 101.

The control scheduling function 813 of the scheduling device 810 executes the control scheduling of the autonomous mobile robot 102 based on states of the sample, reagent, consumable relating to the devices and units in the automatic analysis area 101, which have been stored in the examination DB 814, and registers the information in the control DB 815. The autonomous mobile robot 102 has a plurality of operation modes. The control DB 815 contains information of the current operation mode of the autonomous mobile robot 102. The scheduling device 810 assigns tasks to the respective autonomous mobile robots 102, respectively based on the state information of the device in the automatic analysis area 101, which is stored in the examination DB 814, and the operation mode information of the autonomous mobile robot, which is stored in the control DB.

The autonomous mobile robot 102 includes a robot controller 820. The robot controller 820 is a controller that executes the task set by the scheduling device 810. The robot controller 820 is mountable using a control board loaded with the processor, memory and the like, and includes a monitoring function 821, an operation determining function 822, and an actual operation processing function 823.

The monitoring function 821 monitors the states of the sample, reagent, consumable and the like relating to the device and the unit in the automatic analysis area 101, which are displayed on the device and the unit. Upon acquirement of the information (alarm output from the device), such information is transmitted to the scheduling device 810.

The operation determining function 822 accesses the scheduling device 810 to recognize its own task which has been registered in the control DB 815, and proceeds to the operation mode corresponding to the assigned task. When the task is finished, the end report is output to the scheduling device 810.

The actual operation processing function 823 executes the assigned task. Execution of the program specified by an operation control group 824 allows the operation corresponding to the operation mode to be carried out. The operation mode includes a sample loading mode 825, a reagent replacing mode 826, a transporting mode 827, and a wasting mode 828.

Referring to FIG. 8, the scheduling device 810 and the autonomous mobile robot 102 are in the separate blocks, respectively. If the automatic analysis system has one or small number of autonomous mobile robots, it is possible to impart the function of the scheduling device to the robot controller of one of the autonomous mobile robots.

An explanation will be made (see FIG. 1) with respect to an example of operations of the autonomous mobile robot 102 for replenishing the analyzing unit 103 with the reagent from the refrigerator 108a. The scheduling device 810 obtains the reagent residual amount in the analyzing unit 103. The scheduling device 810 may be configured to obtain the reagent residual amount directly from the analyzing unit 103 to determine that the reagent residual amount is equal to or smaller than a threshold value. Alternatively, the analyzing unit 103 is allowed to determine that the reagent residual amount is equal to or smaller than the threshold value, and the result is displayed on the reagent consumable state display unit 222 (see FIG. 2). The autonomous mobile robot 102 then recognizes from the display that the reagent residual amount is equal to or smaller than the threshold value, or the reagent replenishment is necessary so that the information is transmitted to the scheduling device 810.

If the scheduling device 810 obtains the reagent residual amount directly from the analyzing unit 103, operation information 900 of the analyzing unit as illustrated in FIG. 9 is recorded in the examination DB 814. A column 901 represents an identification number of the analyzing unit that exists in the automatic analysis area 101. A column 902 represents the number of samples waiting for processing at a sample loading port of the automatic analyzer. A column 903 represents a residual amount of reagent A. A column 904 represents a residual amount of reagent B. A column 905 represents a residual amount of reagent C. The number "1" expressed as each remaining rate of the reagents A to C indicates the state of being full, and the number "0" indicates the state of being empty. If the residual amount of the reagent becomes equal to or smaller than the set threshold value, it is determined that replenishment is necessary. In the case where the threshold value is set to 0.1, it may be determined that the analyzing unit 2 is short of the reagent B, and the analyzing unit 3 is short of the reagents A and C.

If the monitoring function 812 determines that the reagent residual amount of the analyzing unit 103 is equal to or smaller than the threshold value, the control scheduling function 813 assigns the task for reagent replacement to the autonomous mobile robot 102, and registers the task in the control DB 815. A plurality of tasks may occur depending on contents of the operation. Moving path information for execution of the task by the autonomous mobile robot 102 is also registered in the control DB. In this example, the scheduling device 810 searches the examination DB 814 to identify the refrigerator 108a having the reagent required to be replenished. The moving path is set, which starts from the wait station and returns thereto via the refrigerator that stores the predetermined reagent, and the analyzing unit to be replenished with the reagent.

As the same reagents in different lots may differ in constituent concentration of the reagent, the reagents in the same lot have to be used for obtaining accurate analysis results. In the case of using the reagents in the different lots, execution of at least one of QC (Quality Control) and calibration of analytical curve is required again. It is preferable to continuously use the reagents in the same lot from the perspective of analysis efficiency. If the analyzing unit 103 is communicating the state information with the scheduling device 810, it is preferable to allow the state information to contain the reagent lot information for transmission. Meanwhile, if the autonomous mobile robot 102 detects the need of reagent replenishment from the reagent consumable state display unit 222 of the analyzing unit 103, at least the reagent lot information is obtained together with the information of the reagent to be replenished using the interface for robot.

A modified example as described below is available when the scheduling device 810 determines the reagent residual amount of the analyzing unit 103. For example, the time taken for consuming the residual reagent (remaining time) is predicted from the reagent consumption rate. It may be determined whether or not replenishment is required based on the prediction. Alternatively, the examination item assigned to each of the analyzing units is obtained from the LIS 801, and each consumption amount of the reagents is calculated from the consumption amount of the reagent by the examination item so that the remaining time is predicted. Alternatively, the consumption rate and the consumption time of the reagent may be predicted utilizing the statistical approach and machine learning.

FIG. 10 illustrates an example of consumable information 1000 of the storage chamber, which is recorded in the examination DB 814. A column 1001 represents an identification number of the storage chamber (refrigerator, storage rack) in the automatic analysis area 101. A column 1002 represents a location in the storage chamber at which the article is stored. A column 1003 represents the stored article. A column 1004 represents an identification number of the stored article. A column 1005 represents the lot of the stored article. A column 1006 represents an expiration data set for the stored article. If the reagent A is to be replenished, and the reagent A is searched in the column 1003, a plurality of search results are obtained. In this case, a priority order is set based on the lot (column 1005), the identification number (column 1004), the expiration date (column 1006), and the storage chamber (column 1001) so that the article to be obtained is identified.

When the autonomous mobile robot 102 obtains the assigned task and the moving path, which have been registered in the control DB 815 by the operation determining function 822 of the robot controller 820, the actual operation processing function 823 proceeds the autonomous mobile robot 102 to the reagent replacing mode 826. After moving on the set moving path to arrive the refrigerator 108a, the autonomous mobile robot 102 in the reagent replacing mode 826 takes out the reagent required for replenishment. That is, the reagent corresponding to the predetermined lot is taken out in accordance with the replenishment reagent information and the lot information. If there is no reagent in the same lot, the corresponding reagent in the different lot is taken out. Upon handling of the reagent, the autonomous mobile robot 102 allows the manipulator to open the door of the refrigerator, and close the door after taking out the reagent. If the refrigerator 108a has the mechanism for selecting and taking one of articles in the refrigerator 108a, the reagent is taken out utilizing such mechanism.

It is possible to affix the label that allows individual identification such as the bar code and the RFID tag containing information of items included in the consumable information 1000, and the further detailed information so that the autonomous mobile robot 102 recognizes such information. In the absence of the consumable information 1000 in the examination DB 814, the moving path is set to allow the autonomous mobile robot 102 to access every storage chamber in the automatic analysis area 101 to find the desired article. The autonomous mobile robot 102 finds the desired article by identifying the bar code and the RFID tag affixed to the reagent.

After receiving the reagent, the autonomous mobile robot 102 moves to the analyzing unit 103 that needs reagent replenishment in accordance with the set moving path. After arrival, the autonomous mobile robot 102 allows the manipulator to operate the analyzing unit internal operation unit 213 to notify the analyzing unit 103 of the reagent replacement. The loading port 221 is operated to execute the reagent replenishment. As described above, if the replaced reagent is in the different lot, the additional processing has to be executed. If the lot numbers differ as a result of comparison with the lot number by the analyzing unit 103, at least one of the QC and calibration of the analytical curve may be executed. Alternatively, when the autonomous mobile robot 102 replaces the reagent with the one in the different lot, it is possible to notify the analyzing unit 103 of execution of at least one of the QC and the analytical curve calibration using the interface for robot.

An explanation will be made from another perspective with respect to an example of operations carried out by the autonomous mobile robot 102 to load the sample from the work table 110 to the analyzing unit 103 (see FIG. 1). It is assumed that a new sample is prepared on the work table 110. The scheduling device 810 obtains the information indicating arrival of the sample in the automatic analysis system from the LIS 801. Alternatively, light of the lamp or notification sound indicating arrival of the sample on the work table 110 is detected by the autonomous mobile robot 102 via the sensor (camera, microphone) so that the detected information is transmitted to the scheduling device 810. The scheduling device 810 obtains the examination content of the sample from the LIS 801, determines the analyzing unit as the destination of the transport, and then registers the task to be executed by the autonomous mobile robot 102 in the control DB 815. Upon registration of the task, it is determined whether the sum of the number of samples waiting for loading (column 902) and the number of the samples expected to be transported exceeds the capacity of the sample loading port of the analyzing unit by referencing the number of samples waiting for the process at the sample loading port in the column 902 of the operation information 900 of the analyzing unit (see FIG. 9). If the sum exceeds the capacity, it is determined that registration of the sample loading task in the control DB 815 is suspended. When acquiring the assigned task and the moving path, which have been registered in the control DB 815 by the operation determining process executed by the robot controller 820, the actual operation processing function 823 proceeds the autonomous mobile robot 102 to the sample loading mode.

An explanation will be made with respect to the method implemented by the scheduling device 810 for assigning the task to multiple autonomous mobile robots 102 of the automatic analysis system. FIG. 11 shows task management data in the control DB 815, and FIG. 12 shows operation mode management data of the autonomous mobile robot in the control DB 815.

Referring to the task management data 1100, a column 1101 represents a task issue date. A column 1102 represents an identification ID of task. A column 1103 represents priority of task. A column 1104 represents a type of task. A column 1105 represents an identification number of autonomous mobile robot to which the task is assigned. A column 1106 represents the device or the unit as a target where the task is executed. A column 1107 represents an identification ID of the target handled in the task. A column 1108 represents a current operation state. The term "working" herein denotes the state that the assigned task has been transmitted to the autonomous mobile robot, and the task end report (upon reception of the task end report from the robot, the task will be deleted from the task management data 1100) is not output. The term "not processed" denotes the state before transmitting the assigned task to the autonomous mobile robot. Referring to the operation mode management data 1200, a column 1201 represents an identification number of the autonomous mobile robot. A column 1202 represents the operation mode assigned to the autonomous mobile movement robot.

An explanation will be made with respect to an exemplary case of assigning the new reagent replacing task executed for the specific analyzing unit to one of the autonomous mobile robots. Preferably, the assignment is made to distribute the load among the autonomous mobile robots, and to prevent the frequent switching of the operation mode of the autonomous mobile robot for efficient processing. Referring to the column 1202 of the operation mode management data 1200, the list of the autonomous mobile robots in the operation mode of "reagent replacing" is obtained. In this case, the robots Nos. 4 and 5 are in the list. Then referring to the column 1105 of the task management data 1100, the information of the currently assigned task is obtained. In this case, two reagent replacing tasks are assigned to the robot No. 5, and the task is not assigned to the robot No. 4. The additional reagent replacing task is newly assigned to the robot No. 4.

The task assignment is not limited to the foregoing assignment method. The assignment may be made based on the predicted operation time of the autonomous mobile robot. An explanation will be made with respect to an exemplary case that the sample loading task for the specific analyzing unit is assigned to one of the autonomous mobile robots. In this case, the autonomous mobile robots with Nos.

3 and 8 are in the operation mode of "sample loading". One sample loading task is assigned to the robot No. 3, and two sample loading tasks are assigned to the robot No. 8. Each time taken for completing the task is calculated from the transport distance. Referring to the task destination information (column 1106), the robot No. 3 transports one sample from the refrigerator 108a to the automatic analyzer 111. Meanwhile, the robot No. 8 transports two samples from the refrigerator 108a to the processing unit 105. If it is predicated from the transport distance that the task to the robot No. 8 is completed earlier, the additional sample loading task is newly assigned to the robot No. 8.

Upon completion of the task, the autonomous mobile robot returns to the wait station to output the task end report to the scheduling device 810, and receives transmission of a new task. If the scheduling device 810 assigns a plurality of tasks to the foregoing autonomous mobile robot, the scheduling device 810 prioritizes the assigned tasks, and transmits the task with the highest priority to the autonomous mobile robot.

For example, referring to the task management data 1100, two tasks are assigned to the robot No. 8. Upon determination of the priority of the task to be executed, the priority order may be determined in accordance with the task issue date (column 1101), the priority of task (column 1103), or a combination thereof. Alternatively, the priority order may be determined in accordance with a short length of time taken for completing all tasks. It is assumed that the task of transporting the sample to the automatic analyzer 112b is newly assigned to the robot No. 8. The priority order to be given to the task ID 9 or the newly issued task is determined after completion of the task ID 7. If the priority order is given first to the task ID 9, and then the new task, the autonomous mobile robot moves to the refrigerator 108a, the processing unit 105, and the automatic analyzer 112b sequentially. Meanwhile, if the priority order is given first to the new task, and then the task ID 9, the autonomous mobile robot moves to the refrigerator 108a, the processing unit 105, the automatic analyzer 112b, and the processing unit 105 sequentially, resulting in extended moving path. In this case, the priority order is given first to the task ID 9, and then the new task while taking increase in the moving time into consideration.

An explanation will be made with respect to the moving path set by the control scheduling function 813 of the scheduling device 810 for execution of the task by the autonomous mobile robot. As the destination (column 1106) is set in the task management data 1100, the scheduling device 810 sets the path on which the autonomous mobile robot starts moving from the wait station, and returns to the wait station via the devices including the destination necessary for executing the task. FIG. 13 illustrates a map 1301 of the automatic analysis area 101, which is stored in the examination DB 814. The automatic analysis area on the map 1301 is divided into mesh-like areas. In this example, the map is divided into 10 (1 to 10) sections in an X-direction, and divided into 5 (A to E) sections in a Y-direction so that the position in the automatic analysis area 101 is specified in coordinates indicating the area (area coordinate). For example, the position of the wait station (section 1302) in which the autonomous mobile robot 102 is kept waiting is located at an "area E4" on the map 1301. A structure existing in the automatic analysis area 101 is specified on the map 1301. For example, devices are disposed in the sections 1303 (area E8-E10) and 1304 (area B2-B4), respectively. The section 1305 (area B7) indicates the position of the pillar in the room. Besides the structures, a section that prohibits entrance of the autonomous mobile robot 102 may be set, for example, the section 1306 (area D6-E7). The off-limit section may be set permanently or temporarily. For example, in the automatic analysis area, when contamination occurs, an obstacle exists, or a human is working, such region may be set as the off-limit section. Assuming that the automatic analyzer is positioned in the section 1304, having its back surface directed to a row A, and power cable, water piping, and drainage piping of the automatic analyzer are exposed from the back surface, the area A2-A4 may be set as the off-limit area for securing safety. The moving path is set to bypass the sections with those structures and the off-limit section.

The scheduling device 810 sets the moving path of the autonomous mobile robot using the area coordinates. FIG. 14 shows a moving path table that stores the moving path set by the scheduling device 810, which is registered in the control DB 815. Referring to the moving path table 1400, a column 1401 represents an identification number of the autonomous mobile robot. A column 1402 represents an area moving order. A column 1403 represents a path (passing area coordinate). A column 1404 represents an estimated time at which the robot arrives the area coordinate specified as the path. A column 1405 represents a type of movement at the area coordinate specified as the path. A column 1406 represents a moving speed indication of the robot passing through the area coordinate specified as the path.

The path for the autonomous mobile robot in the area E4 is obtained by setting the area adjacent to the section 1304 as the initial destination. The areas E3, D4, and E5 each as the position moved from the area E4 by one square are set as the temporary destinations. However, as those three squares are not adjacent to the section 1304, the second destination is searched to set the areas E2, D3, C4, D5 as the next temporary destinations. As the area C4 among those areas is the adjacent area, the path including the areas D4 and C4 is set as the moving path for executing the task. The resultant records are registered in the moving path table 1400 corresponding to the number of the paths (record 1407, 1408). Generally, the route search algorithm such as Dijkstra's algorithm and A* (A-star) algorithm may be employed for the foregoing searching approach.

The record that does not involve the position movement may be included in the moving path table 1400. For example, if the autonomous mobile robot is in the area B10, and the storage chamber exists in the area B9, the robot can access the storage chamber simply by turning for changing the direction. A record 1409 in which the direction change (column 1405) is set as the moving path is registered.

In order to maintain running safety of the autonomous mobile robot, the moving speed on the moving path may be specified (column 1406). In an example shown in FIG. 14, the speed level in the area D4 is set to 3, and the speed level in the area C4 is lowered to 2 for the purpose of reducing the risk of collision against the device in the section 1304 (records 1407, 1408).

The method of correlation between the path set on the map 1301 and the actual space in which the autonomous mobile robot 102 actually moves is not necessarily limited. In a simple method, a frame corresponding to the area on the map may be displayed on the floor of the automatic analysis area 101 so that the frame is recognized for each passage of the autonomous mobile robot 102. Alternatively, a plurality of beacons may be disposed on the automatic analysis area 101 for identifying the current position.

Regarding assignment of the task to the autonomous mobile robots, an explanation has been made with respect to the example that the task is assigned without changing the operation mode of the robot with reference to FIGS. 11 and 12. There may be no autonomous mobile robot in the operation mode corresponding to the new task. For example, assuming that the autonomous mobile robots are in the states as shown in FIG. 12, if the new task of waste disposal occurs, there is no robot in the operation mode corresponding to such task. In such a case, the robot assigned with no task, or a few tasks is brought into the operation mode for processing the new task. Each number of tasks assigned to the respective autonomous mobile robots managed with the operation mode management data 1200 as shown in FIG. 12 is obtained from the task management data 1100 as shown in FIG. 11. As a result, the robot No. 1 is assigned with one task. The robot No. 3 is assigned with one task. The robot No. 4 is assigned with no task. The robot No. 5 is assigned with two tasks. The robot No. 8 is assigned with two tasks. Consequently, the operation mode of the robot No. 4 is changed from the reagent replacing to the waste disposal.

There may be the case that the autonomous mobile robot assigned with no task does not exist. In this case, the robot assigned with a few tasks may be selected as the one having its operation mode changed. In this case, the robot assigned with a few tasks is the robot No. 1 or No. 3. The operation mode of the robot No. 3 is the same as the operation mode of the robot No. 8. The robot in the same operation mode as the robot No. 1 does not exist. Consequently, the operation mode of the robot No. 3 is changed to the waste disposal. In another case, referring to the column 1108 of the task management data 1100, the robot No. 1 is in the "not processed" state. Meanwhile, the robot No. 3 is in the "working" state. If the priority of the new task is higher than the task that has been assigned to the robot No. 1, the operation mode of the robot No. 1 may be temporarily changed to the waste disposal. Alternatively, each task processing time is simulated based on assignment of tasks in multiple patterns. The autonomous mobile robot having the operation mode changed may be determined so that the assigned task is executed in the shortest time.

It is convenient if the operation mode of the autonomous mobile robot can be manually changed by the human. It is possible to provide the autonomous mobile robot with a physical switch for changing the operation mode. The robot in the wait station may be configured to directly change the operation mode.

The foregoing autonomous mobile robot 102 uses the camera or the like to recognize the information in the automatic analysis system, and monitors whether or not the device and the unit output signals indicating abnormality while moving in the automatic analysis area 101 (monitoring function 821 of the robot controller 820). The monitoring process is carried out during execution of the assigned task. The autonomous mobile robot assigned with no task is allowed to patrol in the automatic analysis area for the purpose of monitoring (referred to as "patrol mode").

A certain type of the abnormality that occurs in the automatic analyzer and the storage chamber may disable the network communication from transmitting the abnormality to the scheduling device. Under the circumstance, the warning lamp that can be recognized by the camera of the autonomous mobile robot 102, and the warning sound that can be recognized by the microphone (collectively referred to as "warning signal") may be set to generate the warning signal when the device or the unit detects its own abnormality. Recognizing the warning signal, the autonomous mobile robot 102 detects the abnormality in the device or the unit. It is also possible to use an optical signal pattern, a waveform of the warning sound (sound wave in the inaudible region is preferable) rather than the simple warning, or wired communication by calling the autonomous mobile robot 102 to come closer for transmitting the detailed information.

An example of a flow to be processed when abnormality occurs in the autonomous mobile robot will be described referring to FIG. 15. An abnormality in the autonomous mobile robot 102 is detected (S1501). The autonomous mobile robot 102 may be configured to detect its abnormality by itself. Alternatively, the monitoring camera or the like may be used for monitoring the automatic analysis area 101. It is then determined whether or not the abnormality indicates contamination in the robot (S1502). For example, if the sample adheres to the autonomous mobile robot 102 owing to the operational error, it is determined that contamination has occurred. If contamination occurs, the operation mode of the autonomous mobile robot 102 is set to the stop mode to prevent spreading of the contamination resulting from movement of the contaminated robot in the automatic analysis area 101. The operation of the robot is then stopped (S1503). Meanwhile, if no contamination occurs, it is determined whether or not the autonomous mobile robot 102 is movable (S1504). If the robot is movable, the operation mode of the autonomous mobile robot 102 is set to the maintenance mode. In the maintenance mode, the autonomous mobile robot 102 moves to a predetermined maintenance place, and is brought into the waiting state (S1505). If the robot is immovable, the operation mode of the autonomous mobile robot 102 is set to the stop mode, and the operation is stopped (S1503).

Then the human (operator) is notified of the state of the autonomous mobile robot 102 (S1506). The notice to the human is performed in the externally recognizable manner, for example, by blinking the lamp attached to the body of the autonomous mobile robot, and making the warning sound. It is possible to notify the information via the scheduling device 810 or the like. The control schedule is changed by the scheduling device 810 (S1507). For example, if the processing applied to the autonomous mobile robot with abnormality exists in the task management data 1100 (see FIG. 11), the task that has been assigned to such robot is allocated to another autonomous mobile robot. The allocating process may be executed in the manner similar to the process of assigning the new task.

The automatic analysis system of the embodiment is configured on the assumption that the operator and the autonomous mobile robot work in the same automatic analysis area in the same time period. In the automatic analysis area 101, the operator moves in the wide range for a short period of time to perform the maintenance of the device. In the circumstance, the moving path set by the scheduling device 810 may fail to follow up the foregoing operation flow. In order to prevent interference between the operator and the autonomous mobile robot, it is necessary to take measures against collision of the operator or the autonomous mobile robot on site. FIG. 16 illustrates the state where an operator 1601 and the autonomous mobile robot 102 are approaching each other.

A sensor 1605 for detecting a human (for example, motion sensor) is disposed in the automatic analysis area 101 where the automatic analyzers 1603, 1604 are disposed. In this example, the operator 1601 is moving toward the automatic analyzer 1603, and the autonomous mobile robot 102 is moving toward the automatic analyzer 1604. Their moving paths are crossing each other. In a first method of securing safety of the operator 1601, the operator 1601 is notified of the situation that the autonomous mobile robot 102 exists nearby, or a moving path 1606 of the autonomous mobile robot 102. For example, the autonomous mobile robot 102 is provided with the warning lamp and the speaker for outputting the warning signal upon the movement so that the operator 1601 becomes aware of the existence of the approaching autonomous mobile robot 102. Alternatively, the warning may be output to the device held by the human via the network. The warning lamp disposed on the floor may be configured to be lit at a predetermined timing before arrival of the robot 102, or the moving path may be displayed on the device of the operator 1601 for notifying the operator 1601 of the moving path 1606. It is possible to display the moving path on the map of the automatic analysis area as shown in FIG. 13 on the tablet device of the operator, or to display the additional moving path information on the floor or the space of the automatic analysis area using the AR (Augmented Reality) device.

In one of methods that allow the autonomous mobile robot 102 to recognize existence of the operator 1601, the device held by the operator 1601 outputs wireless signals (the wireless signal is required not to affect the device in the automatic analysis area) intermittently to send a notice to the autonomous mobile robot 102. In another method, the autonomous mobile robot 102 reads the RFID tag held by the operator 1601. In another method, the information is obtained from the sensor 1605. In another method, the camera and the ranging sensor of the autonomous mobile robot 102 detect the existence of the moving body. If the autonomous mobile robot 102 recognizes existence of the operator 1601, it is preferable to lower the moving speed for safety even if the moving speed has been specified (see FIG. 14). If the moving paths are overlapped, it is preferable to be temporarily stopped.

Samples to be analytically measured by the automatic analyzer may include the strongly infectious sample. In this case, contamination of the human by the infectious sample owing to the intervention of the robot for transporting such sample has to be avoided. FIG. 17 shows an example of a sample management table 1700 registered in the examination DB 814. A column 1701 represents an identification ID of the sample. A column 1702 represents a warning level of contamination of the sample. A column 1703 represents an examination item of the sample. The scheduling device 810 obtains the sample identification ID of the sample and the examination item, which are contained in the sample request information from the LIS 801. Based on the examination item, the preliminarily set contamination warning level is determined. The level is then registered as the sample management table 1700 in the examination DB 814. Upon assignment of the sample loading task, the autonomous mobile robot 102 obtains the contamination warning level information of the sample from the sample management table 1700 so that the warning mode in accordance with the warning level is set. In the case of the sample with high contamination warning level, the autonomous mobile robot 102 warns the peripheral operator likewise the manner similar to warning on the moving path.

In the period of time in which the operator and the autonomous mobile robot are working in the same area, the risk of lowering efficiency of the autonomous mobile robot is unavoidable. It is therefore effective for managing presence/absence of the operator in the automatic analysis area so that the autonomous mobile robot is operated to improve the efficiency in the absence of the operator. FIG. 18 shows an example of an operator management tale 1800 to be registered in the examination DB 814. In this example, the automatic analysis area 101 is divided into two working areas (areas 1, 2). A period of time 1801 is defined by the start time and the end time, indicating each number of operators in the areas 1 and 2 (column 1802, column 1803). The operator management table 1800 may be made from the work shift schedule of the operator, or obtained from the data for managing access to the automatic analysis area 101. In this example, from 20:00 in 2018/12/10 on, there are no operators both in the areas 1 and 2. From 18:00 in 2018/12/10 on, there is no operators in the area 1. The working efficiency of the autonomous mobile robot 102 may be improved by increasing the moving speed and the operation speed of the manipulator in the area 1 at 18:00 in 2018/12/10 on, and in the areas 1 and 2 at 20:00 on. This makes it possible to improve the working efficiency.

Meanwhile, as the operator and the autonomous mobile robot work in the same area, the working efficiency may be further improved. For example, there is a certain work that can be performed by the operator more smoothly than the autonomous mobile robot. In the circumstance, the operator is expected to perform the task that can be manually executed more efficiently, and the robot is expected to perform the task that can be executed by the autonomous mobile unit more efficiently so that the high efficiency may be achieved in the end. In this case, the column 1105 of the task management data 1100 is configured to receive an entry of the operator's identification number as well as the identification number of the robot to allow assignment of the task to the human as well. In the foregoing control scheduling process of the autonomous mobile robot, the human may also be scheduled in the similar way to handling of the autonomous mobile robots in consideration of the number of tasks assigned to the human, and the task processing time. Upon arrival of the urgent sample that needs to be immediately processed, each of total operation times taken for both the autonomous mobile robot and the human, including the moving time and the time for operating the device is calculated so that the task is assigned to either the human or the robot whichever the processing can be executed in the shorter time. The time may be calculated by using values of the processing time specified for the autonomous mobile robot and the human, respectively. Alternatively, each processing time taken by the autonomous mobile robots and individuals may be predicted through machine learning using the past measurement data. If the task is assigned to the operator, the notice is sent to the device held by the operator for instructing execution of the task.

The autonomous mobile robot and the human are allowed to work collaboratively. For example, when the sample and the reagent have to be taken from the device for the maintenance of the automatic analyzer, the autonomous mobile robot will preliminarily take the sample and the reagent, and the human executes the maintenance of the device. After the human finishes the maintenance, the autonomous mobile robot loads the sample and the reagent again. When scheduling the maintenance, a plurality of tasks are generated in accordance with the maintenance request transmitted to the scheduling device as the information on the automatic analyzer. This makes it possible to assign the tasks to the operator and the autonomous mobile robot, respectively.

As the present invention has been described in reference to the embodiment, the present invention is not limited to the foregoing embodiment, but includes various modifications. The embodiment is described for readily understanding of the present invention which is not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

REFERENCE SIGNS LIST

- 101: automatic analysis area
- 102: autonomous mobile robot
- 103, 104: analyzing unit
- 105: processing unit
- 106: sample transport device
- 107: controller
- 108: storage chamber
- 108a: refrigerator
- 108b: storage rack
- 109: waste container
- 110: work table
- 111, 112: automatic analyzer
- 115: wait station
- 201: analyzing unit
- 203: sample loading/discharging unit
- 204: operation screen
- 211: analyzing unit identification information display unit
- 212: analyzing unit state display unit
- 213: analyzing unit internal operation unit
- 214: reagent consumable loading unit
- 221: loading port
- 222: reagent consumable state display unit
- 223: operation button
- 224: position marker
- 225 reagent consumable loading unit identification information display unit
- 231: loading/discharging position
- 401: main body
- 402: refrigerator identification information display unit
- 403: sliding door
- 404: knob
- 405: refrigeration-required product
- 406: rack
- 407: position marker
- 408: access portion
- 409: controller
- 410: operation screen
- 411: operation button
- 501: waste container main body
- 502: waste container identification information display unit
- 503: position marker
- 504: controller
- 505: operation screen
- 506: operation button
- 601: button portion
- 602: cover portion
- 603: buffer material
- 701: image input device
- 702: head portion
- 703: driving portion
- 704: loading stand portion
- 705: rotating mechanism
- 706: arm portion
- 707: hand portion
- 708: sensor device
- 709: storage rack
- 710: position marker
- 801: LIS
- 810: scheduling device
- 820: robot controller
- 900: operation information
- 1000: consumable information
- 1100: task management data
- 1200: operation mode management data
- 1301: map
- 1400: moving path table
- 1700: sample management table
- 1800: operator management table

The invention claimed is:

1. An automatic analysis system comprising:
a plurality of devices that are disposed in an automatic analysis area and includes an analyzing unit included in an automatic analyzer; and
a robot that moves in the automatic analysis area, wherein
an operation screen of the analyzing unit has a first screen mode which displays state information of the analyzing unit using characters and images detectable by an operator and a second screen mode which displays tag information detectable by the robot and providing the state information to the robot, and is switchable between the first screen mode and the second screen mode, and
the robot obtains state information of the analyzing unit from the operation screen in the second screen mode.

2. The automatic analysis system according to claim 1, further comprising:
a scheduling device that assigns a task to the robot based on state information of the devices, wherein
the robot transmits the state information of the analyzing unit to the scheduling device based on the operation screen of the analyzing unit in the second screen mode, and
the scheduling device updates the state information of the analyzing unit.

3. The automatic analysis system according to claim 1, wherein
the tag information comprises a two-dimensional bar code which is displayed in the second screen mode, and
the robot obtains the state information of the analyzing unit by reading the two-dimensional bar code.

4. The automatic analysis system according to claim 1, wherein
the operation screen of the analyzing unit is a touch panel, and
an operation button displayed on the operation screen in the second screen mode is larger than an operation button displayed on the operation screen in the first screen mode.

5. The automatic analysis system according to claim 2, wherein
the scheduling device has map information of the automatic analysis area, and
the scheduling device transmits an assigned task and a moving path for executing the task to the robot, the moving path being set using the map information.

6. An automatic analysis system comprising:
a plurality of devices that are disposed in an automatic analysis area and includes an analyzing unit included in an automatic analyzer; and
a robot that moves in the automatic analysis area, wherein
an operation screen of the analyzing unit has a first screen mode for an operator and a second screen mode for the robot and is switchable between the first screen mode and the second screen mode, the robot obtains state information of the analyzing unit from the operation screen in the second screen mode, the devices include a sliding door type storage chamber, and in a knob of the storage chamber, an access portion that enlarges an area of the knob is provided so as to facilitate storage executed by a manipulator of the robot.

7. An automatic analysis system comprising:

a plurality of devices that are disposed in an automatic analysis area and includes an analyzing unit included in an automatic analyzer; and a robot that moves in the automatic analysis area, wherein an operation screen of the analyzing unit has a first screen mode for an operator and a second screen mode for the robot and is switchable between the first screen mode and the second screen mode, the robot obtains state information of the analyzing unit from the operation screen in the second screen mode, the devices include a device including an operation button that causes a predetermined process to be executed when being pressed by the operator or the robot, the operation button has a first state for the operator and a second state for the robot, the first state being a state where a cover portion that is opened or closed to switch whether or not the operator is accessible to a button portion, and the second state being a state where a buffer material is provided on the button portion without providing the cover portion, and the operation button is switchable between the first state and the second state by detachably providing each of the cover portion and the buffer material.

8. An automatic analysis system comprising:

a plurality of devices that are disposed in an automatic analysis area;

a robot that moves in the automatic analysis area for monitoring the devices; and a scheduling device that assigns a task to the robot based on state information of the devices, wherein the robot has a plurality of operation modes each for executing a predetermined operation to any one of the devices, the scheduling device is communicably connected to at least one of the devices and obtains state information of the communicably connected device, the robot detects a signal output from the devices in the automatic analysis area, obtains state information of the device outputting the signal, and transmits the obtained state information to the scheduling device, the robot executes the predetermined operation in the operation mode in accordance with the assigned task, the devices include a first interface for an operator and a second interface for the robot, an operation screen of the devices has switchable screen modes, displays a screen mode for an operator as the first interface, and displays a screen mode for the robot as the second interface, and the first screen mode displays the state information using characters and images detectable by an operator and the second screen mode displays tag information detectable by the robot and providing the state information to the robot.

9. The automatic analysis system according to claim 8, wherein the devices include at least any one of an automatic analyzer, a storage chamber that stores a consumable, a waste container, and a medical examination information system.

10. The automatic analysis system according to claim 8, wherein the devices include an analyzing unit that is included in an automatic analyzer and a refrigerator that stores a reagent used for analysis of a sample in the analyzing unit, and the robot detects the signal that is output from the analyzing unit to notify necessity of replenishment of a reagent in the automatic analysis area, obtains at least reagent information regarding the reagent to be replenished and lot information of the reagent using the second interface, and transmits the reagent information regarding the reagent to be replenished and the lot information to the scheduling device as state information of the analyzing unit.

11. The automatic analysis system according to claim 10, wherein the scheduling device has map information of the automatic analysis area, and the scheduling device transmits a reagent replacing task, a moving path for executing the reagent replacing task, and a speed on the moving path to the robot, the reagent replacing task being a task of replacing a reagent based on the reagent information regarding the reagent to be replenished and the lot information, and the moving path being set using the map information.

12. The automatic analysis system according to claim 10, wherein the robot includes a sensor that reads reagent information using a label that is attached to a reagent stored in the refrigerator, and the robot receives a reagent corresponding to the reagent information regarding the reagent to be replenished and the lot information from the refrigerator using the second interface of the refrigerator, or obtains the reagent corresponding to the reagent information regarding the reagent to be replenished and the lot information from the refrigerator using the sensor.

13. The automatic analysis system according to claim 12, wherein in a case where only a reagent having a different lot from the reagent corresponding to the reagent information regarding the reagent to be replenished and the lot information is present in the refrigerator, the robot transports the reagent having the different lot to the analyzing unit and urges the analyzing unit using the second interface to execute at least any one of QC (Quality Control) or calibration of a calibration curve.

14. The automatic analysis system according to claim 8, wherein a plurality of robots are provided, and the scheduling device assigns tasks to the robots so as to distribute a load.

15. The automatic analysis system according to claim 8, wherein the scheduling device manages presence or absence of an operator in the automatic analysis area and sets an operation speed of the robot in a period of time where the operator is absent in the automatic analysis area to be faster than an operation speed of the robot in a period of time where the operator is present in the automatic analysis area.

16. The automatic analysis system according to claim 8, wherein moving information of the robot or warning information based on a contamination warning level of a sample to be transported by the robot is notified to an operator who is present in the automatic analysis area.

17. The automatic analysis system according to claim 8, wherein in a case where an abnormality occurs in the robot, whether or not contamination occurs due to a sample is determined, and in a case where it is determined that contamination occurs, an operation of the robot is stopped and the abnormality is notified to an operator.

18. The automatic analysis system according to claim 8, wherein the scheduling device manages tasks of an operator and assigns tasks to the robot and the operator, and tasks assigned to the operator includes a task that is a collaborative work shared with the robot.

* * * * *